United States Patent
Davis et al.

(10) Patent No.: US 9,392,034 B2
(45) Date of Patent: Jul. 12, 2016

(54) SYSTEMS AND METHODS OF DISTRIBUTED SILO SIGNALING

(71) Applicants: Jon P Davis, Malvern, PA (US);
Lynnette K Evans, Malvern, PA (US);
Richard L Fuller, Malvern, PA (US);
Gregory J Small, Malvern, PA (US);
Scott S Preston, Malvern, PA (US)

(72) Inventors: Jon P Davis, Malvern, PA (US);
Lynnette K Evans, Malvern, PA (US);
Richard L Fuller, Malvern, PA (US);
Gregory J Small, Malvern, PA (US);
Scott S Preston, Malvern, PA (US)

(73) Assignee: Unisys Corporation, Blue Bell, PA (US)

(*) Notice: Subject to any disclaimer, the term of this patent is extended or adjusted under 35 U.S.C. 154(b) by 84 days.

(21) Appl. No.: 14/538,883

(22) Filed: Nov. 12, 2014

(65) Prior Publication Data
US 2015/0295979 A1 Oct. 15, 2015

Related U.S. Application Data

(60) Provisional application No. 61/948,093, filed on Mar. 5, 2014.

(51) Int. Cl.
| | |
|---|---|
| H04L 29/12 | (2006.01) |
| H04L 29/06 | (2006.01) |
| H04M 3/533 | (2006.01) |
| H04M 7/00 | (2006.01) |
| H04L 29/08 | (2006.01) |
| H04M 7/12 | (2006.01) |

(52) U.S. Cl.
CPC ............ *H04L 65/1069* (2013.01); *H04L 61/10* (2013.01); *H04L 61/2007* (2013.01); *H04L 65/1006* (2013.01); *H04L 65/608* (2013.01); *H04L 67/10* (2013.01); *H04M 3/53308* (2013.01); *H04M 3/53325* (2013.01); *H04M 7/006* (2013.01); *H04M 7/0006* (2013.01); *H04M 7/0024* (2013.01); *H04M 7/0033* (2013.01); *H04M 7/0036* (2013.01); *H04M 7/126* (2013.01)

(58) Field of Classification Search
CPC ................... H04M 3/53325; H04M 3/53308; H04M 7/0006; H04M 7/0024
See application file for complete search history.

(56) References Cited

U.S. PATENT DOCUMENTS

| | | | | |
|---|---|---|---|---|
| 2002/0051463 | A1* | 5/2002 | Higuchi | H04L 29/06027 370/466 |
| 2004/0264439 | A1* | 12/2004 | Doherty | H04L 29/06027 370/352 |
| 2005/0036492 | A1* | 2/2005 | Hoffmann | H04L 29/06027 370/395.2 |
| 2006/0153357 | A1* | 7/2006 | Acharya | H04M 3/5191 379/266.01 |
| 2007/0297394 | A1* | 12/2007 | Allan | H04M 3/42 370/356 |
| 2011/0122863 | A1* | 5/2011 | Balasaygun | H04M 15/00 370/352 |

* cited by examiner

*Primary Examiner* — Asad Nawaz
*Assistant Examiner* — Syed S Ali
(74) *Attorney, Agent, or Firm* — Richard L. Gregson

(57) ABSTRACT

The embodiments described herein recite a telephone communication system used for handling information such as messages, typically voice mail messages, and, more particularly, is directed to a system that provides distributed session initiation protocol (SIP) silos. Distributed SIP silos (DSS) is a Communications Application Platform (CAP) feature that maintains the site's call capacity even when a signaling server fails. DSS uses multiple non-redundant signaling servers to provide SIP signaling for the same set of media ports. Because there are multiple signaling servers providing signaling for the same set of ports, the failure of one signaling server only terminates the calls it was actively processing and once those calls have been cleaned up, all the available (non-suspended) ports in the configuration are available to the remaining signaling servers.

16 Claims, 11 Drawing Sheets

SYSTEMS AND METHODS OF DISTRIBUTED SILO SIGNALING

CROSS-REFERENCE TO RELATED APPLICATIONS

This application claims priority to U.S. Provisional Patent Application Ser. No. 61/948,093 filed Mar. 5, 2014, entitled "Distributed Silo Signaling," which is hereby incorporated by reference in its entirety.

COPYRIGHT NOTICE

A portion of the disclosure of this patent document contains material which is subject to copyright protection. The copyright owner has no objection to the facsimile reproduction by any one of the patent document or the patent disclosure, as it appears in the Patent and Trademark Office patent the or records, but otherwise reserves all copyright rights whatsoever.

TECHNICAL FIELD

The present invention relates generally to call processing network design architectures, and particularly, to a distributed silo signaling system and method.

BACKGROUND

There exist many types of networks and shared information communications systems. Events may occur in networks (such as access networks) that are external to a packet network provider. For example, if a network is temporarily down or seriously impaired, incoming calls destined to these affected subscribers cannot be successfully completed. All of these incoming calls are instead redirected to voice mail which can cause overload conditions in media servers (MS) that play out voice mail announcements and are usually engineered at a lower capacity level than basic call loads. Consequently, many of these calls get blocked and customer dissatisfaction will result. Broadly defined, a MS is a special server that typically handles and terminates media streams, and also provides services such as announcements, bridges, transcoding, and Interactive Voice Response (IVR) messages.

Traditional communications involve sharing of signaling servers and media resources among application servers using an existing shared network interface unit (Shared NIU) feature. Each signaling server manages a set of media resources. On the media side, if a media box goes down, there is another media box that can be used—n+1 approach. For example, the standby network elements may be hot standby elements or components. A hot standby component is a secondary component which is running simultaneously with the Primary component that can, within a very short period of time (e.g., in the range of milliseconds), be switched over to backup or augment the Primary component. When used in the backup mode, the hot standby component can simply take over the function of the Primary component if the Primary component fails. When used in the augmentation mode, the hot standby component can augment the processing capacity of the Primary component when the Primary component is getting overloaded. However, a problem occurs when a signaling server fails. In this case, the associated media resources are unusable by applications.

In order to save this problem, it is advantageous in provide a network architecture to accommodate utilizing all resources. It would thus be highly desirable to provide a distributed SIP silo signaling (DSS) system and method.

SUMMARY

The embodiments described herein recite a telephone communication system used for handling information such as messages, typically voice mail messages, and, more particularly, is directed to a system that provides distributed SIP (session initiated protocol) silos. Distributed SIP silos (DSS) is a Communications Application Platform (CAP) feature that maintains the site's call capacity even when a signaling server fails. Since more than one signaling module can request ports from a given media server, the port selection needs to be moved from the Signaling Module to the media server. Each media server will need to control its own media. DSS uses multiple non-redundant signaling servers to provide SIP signaling for a given set of media ports. Because there are multiple signaling servers providing signaling for the same set of ports, the failure of one signaling server only terminates the calls it was actively processing and once those calls have been cleaned up, all the available (non-suspended) ports in the configuration are available to the remaining signaling servers.

Incoming calls are sent from the network to any of the signaling servers in the DSS configuration. Once a call has been accepted by a signaling server, the same signaling server will continue to control the call for the duration of that call leg. Calls initiated by a communications CAP host to a resource group in a DSS configuration will select a signaling server from a list of signaling servers that are in the DSS configuration and have signaling available for that resource group. Once a signaling server has been selected for that call or call leg, it will control the call for the duration of the call or call leg. Calls with multiple legs (for example a hairpin call) could have different signaling servers controlling each leg of the call. But once a signaling server is selected fir a leg of a call, it will control the call leg until that leg is terminated. Signaling servers providing Signaling System No. 7 (SS7) signaling in an Active/Standby configuration can also be part of a DSS configuration to allow them to provide SIP signaling for media servers. In this case, only the active or Primary signaling server is actively providing signaling.

In some implementations, a system and/or method may comprise: receiving, by a signaling server from a host server, a command containing a group field and network interface unit identification (NIU id); transmitting, by the signaling server, a select port command to a media server based on the NIU id; receiving, by the signaling server from the media server, an acknowledgement of port selection; transmitting, by the signaling server, a command to a remote endpoint where a session initiated protocol (SIP) call is executed; and receiving, by the signaling server from the remote endpoint, a command indicating that the SIP call has been answered by the remote endpoint.

In additional implementations, the system and/or method may comprise: establishing, by a signaling server, a real-time transport protocol (RTP) session stream for a call between a media server and a remote endpoint using a port; receiving, by the signaling server from a host server, a command to end a call; transmitting, by the signaling server to the media server, a command to release the port of the call; receiving, by the signaling server from the media server, an acknowledgement of the command to release the port of the call; transmitting, by the signaling server to the remote endpoint, a command indicating the call should end; and receiving, by the signaling server from the remote endpoint, an ok message indicating the command indicating the call should end was received.

In yet other implementations, the system and/or method may comprise: establishing, by a signaling server, a first real-time transport protocol (RTP) session stream between a media server and a first remote endpoint using a first port; receiving, by the signaling server from a host server, an initiate operation identifying a destination address of a second remote endpoint and the first port identification (id); transmitting, by the signaling server to the second remote endpoint, a command to initiate a call with the second remote endpoint; transmitting, by the signaling server to the media server, a stop first port command identifying the first port id to stop the media session with the first remote endpoint; receiving, by the signaling server from the media server, an acknowledge command indicating the media session stopped; and establishing, by the signaling server, a second RTP session stream between the first remote endpoint and the second remote endpoint.

In some implementations, the system and/or method may comprise: receiving, by a signaling server from a remote endpoint, an invite to the remote endpoint containing the remote endpoint information needed to establish a real-time transport protocol (RIP) session; transmitting, by the signaling server to a media server, a command to start a port including a remote internet protocol (IP) address and a remote port number; transmitting, by the signaling server to the remote endpoint, an acknowledgment indicating the signaling server viewed the invite; receiving, by the signaling server from the media server, an acknowledgement of the start port command and returning the port to be used for a call; transmitting, by the signaling server to the host server, a command indicating the call to be answered by an application running on the host; and receiving, by the signaling server from the host server, an answer to the call.

In other implementations, the system and/or method may comprise: establishing a real-time transport protocol (RIP) session stream between the media server and the remote endpoint using a port; receiving, by the signaling server from the remote endpoint, a command to terminate the call; transmitting, by the signaling server to the host server, a command containing call data to terminate the call; receiving, by the signaling server from the host server, a command indicating the call has been terminated; transmitting, by the signaling server to the media server, a command to free the port; and receiving, by the signaling server from the media server, an acknowledgement of the command to free the port.

In yet other implementations, the system and/or method may comprise: receiving, by a media server from a signaling server, a command to select a port based on a network interface unit identification (NIU id); transmitting, from the media server to the signaling server, a port selection; receiving by the media server from a signaling server, a command to start a port; transmitting, by the media server to the signaling server, an acknowledgment of the command to start a port; and transmitting, by the media server to a remote endpoint, a real-time transport protocol (RIP) session stream between the media server and the remote endpoint using the selected port.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings. It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Reference will now be made in detail to the preferred embodiments, examples of which are illustrated in the accompanying drawings. The embodiments described herein are intended to be exemplary. One skilled in the art recognizes that numerous alternative components and embodiments may be substituted for the particular examples described herein and still fall within the scope of the invention.

Figure 1:
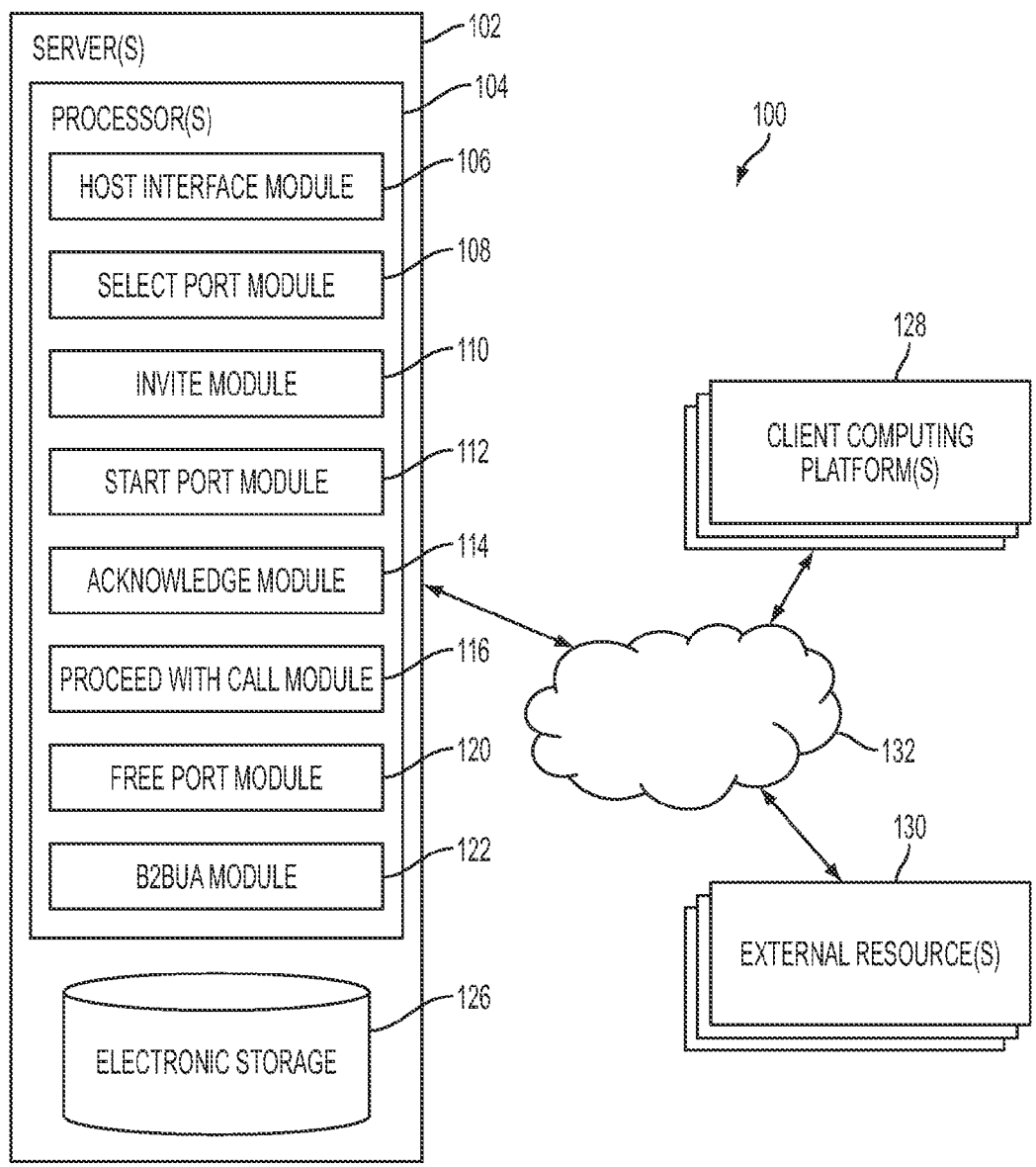
FIG. 1 illustrates a diagram of a system architecture for implementing DSS signaling, according to an exemplary embodiment.

FIG. 1 illustrates a diagram of a system 100 architecture for implementing distributed SIP silo (DSS) signaling, according to an exemplary embodiment. The system 100 may comprise a client computing platform(s) 128 communicating with a server(s) 102 through a network 132. The server(s) 102 may further communicate with external resource(s) 130. The server(s) 102 may be any computing device communicatively coupled over a network 132 to one or more computing devices, such as client computing platform(s) 128 and external resource(s) 130.

The server(s) 102 may comprise electronic storage 126, one or more processor(s) 104, and/or other components. The server(s) 102 may include communication lines, or ports to enable the exchange of information with a network 132 and/or other client computing platform(s) 128 and/or external resource(s) 130. The processor(s) 104 may be configured to execute computer program modules. The processor(s) 104 may be configured to execute the computer program modules via one or more of hardware, software, and/or firmware. Although system 100 may be described in certain sections herein as including server(s) 102, this is not intended to be limiting. For example, server(s) 102 may be implemented by a cloud of computing platforms operating together as server(s) 102.

Processor(s) 104 is configured to provide information processing capabilities in server(s) 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processors) 104 may include a plurality of processing units. These processing units may be physically located within the same device, or processor(s) 104 may represent processing functionality of a plurality of devices operating in coordination. The processor(s) 104 may be configured to execute: an host interface module 106, a select port module 108, an invite module 110, a start port module 112, an acknowledge module 114, a proceed with call module 116, a free port module 120, a back to back user agent (B2BUA) module 122 and/or any other modules. Processor(s) 104 may be configured to execute any modules by software, hardware, firmware, some combination of software, hardware, and/or firmware, and/or other mechanisms for configuring processing capabilities on processor(s) 104.

The server(s) 102 and/or processor(s) 104 may be separate and distinct from system 100, and may be provided by an entity that is separate from, for example, the entity providing system server(s) 102. The server(s) 102 and/or processor(s) 104 may be configured to execute one or more computer program modules. The computer program modules may include one or more of an host interface module 106, a select port module 108, an invite module 110, a start port module 112, an acknowledge module 114, a proceed with call module 116, a free port module 120, a B2BUA module 122 and/or any other modules.

In some implementations, an host interface module 106 when executed on a processor, may be configured to: receive, by a signaling server from a host server, a command indicating an outgoing call containing a group field and network interface unit identification (NIU id), and invoke the Select Port module and the Invite module to continue processing the call. In some implementations, a host interface module 106, when executed on a processor may be configured to: send, by the signaling server to the host server, a command indicating an incoming call which needs to be answered by an application running on the host.

In some implementations, a select port module 108 when executed on the processor, may be configured to: issue, by the signaling server, a select port command to a media server defined by the NIU id, and receive, by the signaling server from the media server, an acknowledge status of port selection and removal of the selected port from an available port list.

In some implementations, the select port module 108 is further configured to: receive, by the signaling server from the media server, a failure indication in the status field, reissue, by the signaling server, a select port command to a second media server defined by the NIU id; and receive, by the signaling server from the second media server, an acknowledge status of port selection and removal of the selected port from an available port list.

In some implementations, the acknowledge status ma be based on acknowledge fields which identify the call by transaction ID, NIU id, Primitive identification (Prim id), channel and call tag.

In some implementations, a Prim corresponds to a logical board and may contain up to 32 channels, which may also be referred to as ports.

In some implementations, an invite module 110, when executed on the processor, may be configured to: issue, by the signaling server, an invite to a remote endpoint where the SIP protocol is executed, and receive, by the signaling server from the remote endpoint, a trying command indicating that the SIP call is being attempted at the remote endpoint. The invite module will then receive, by the signaling server from the remote endpoint, an ok command indicating that the SIP call has been answered by the remote endpoint.

In some implementations, an invite module 110, when executed on a processor may be configured to: receive, by a signaling server from a remote endpoint, an invite to the remote endpoint containing the remote endpoint information needed to establish an RTP session; send, by the signaling server to the remote endpoint, a trying command indicating that the signaling server saw the invite.

In some implementations, a start port module 112 when executed on a processor, may be configured to: after issuing of or receiving of the trying command by the invite module, establish an RTP session between the remote endpoint and the media server by sending from signaling server to the media server a start port command containing the resource, NIU id, Prim id, selected Channel, call tag and signaling NIU.

In some implementations, the start port module 112 when executed on a processor may be configured to: send, by the signaling server to a media server, a start port command including a remote IP address and a remote port number; receive, by the signaling server from the media server, an acknowledgment comprising a transaction ID, NIU id, Prim id, channel and call tag, and returning the port to be used for the call and a local port IP address and local port number and establishing an RTP session between the remote endpoint and the media server.

In some implementations, the start port module 112 when executed on a processor may be configured to: send, by the signaling server to a media server, a start port command including a remote IP address and a remote port number and the NIU id, Prim id and channel received from an earlier Select Port command; receive, by the signaling server from the media server, an acknowledgment comprising a transaction ID, NIU id, Prim id, channel and call tag, local port IP Address and local port number confirming that sent, and establishing an RTP session between the remote endpoint and the media server. In some implementations, an acknowledge module 114 when executed on a processor, may be configured to: after execution of the start port module, acknowledge the start port command with success or failure; wherein when success is indicated, continuing the call; and wherein when failure is indicated, tearing down the call.

In some implementations, a proceed with call module 116 when executed on a processor, may be configured to: after execution of the host interface module, send a command to the network to continue the call and confirm the incoming call with the network.

In some implementations, a free port module 120 when executed on a processor, may be configured to: after receiving by the host interface module 106, a command to finish a call, send, by the signaling server to the media server, a free port command returning the port to the available list; receive, by the signaling server from the media server, an acknowledge command identifying the call by transaction ID, NIU id, Prim id, channel, and call tag.

In some implementations, a B2BUA module 122 when executed on a processor, may be configured to: send, by the signaling server to the network, a re-invite command; receive by the signaling server from the network an ok command; and/or receive, by the signaling server, from the network a bye request.

Although modules 106, 108, 110, 112, 114, 116 and 120 and 122, are illustrated in FIG. 1 as being co-located within a single processing unit, in implementations in which processor(s) 104 includes multiple processing units, one or more of modules 106, 108, 110, 112, 114, 116, 120 and 122, and/or other modules may be located remotely from the other modules. The description of the functions provided by the different modules described above is for illustrative purposes, and is not intended to be limiting, as any of modules 106, 108, 110, 112, 114, 116, 120 and 122, and/or other modules may provide more or less function than is described. For example, one or more modules 106, 108, 110, 112, 114, 116, 120 and 122, and/or other modules may be eliminated, and some or all of its function may be provided by other ones of 106, 108, 110, 112, 114, 116, 120 and 122, and/or other modules. As another example, processor(s) 104 may be configured to execute one or more additional modules that may perform some or all of the functions attributed below to one of 106, 108, 110, 112, 114, 116, 120 and 122, and/or other modules.

Electronic storage 126 may comprise electronic storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc), solid-state storage media (e.g., flash drive, etc.), and/or other electronically readable storage media. The electronic storage 126 may include one or more virtual storage resources (e.g., cloud storage, a virtual private network, and/or other virtual storage resources). Electronic storage 126 may store software algorithms, information determined by processor(s) 104, information received from server(s) 102, information received from client computing platform(s) 128, and/or other information that enables server(s) 102 to function as described herein.

The computer program modules may be configured to enable an expert or user associated with the given client computing platform(s) 128 to interface with system 100 and/or external source(s) 130, and/or provide other functions attributed herein to client computing platform(s) 128.

In the exemplary embodiment, client computing platform(s) 128 may be any computing devices comprising processors and software modules capable of executing the processes and tasks described herein. Non-limiting examples of client computing platform(s) 128 may include a desktop computer, a laptop computer, a handheld computer, a tablet computing platform, a netbook, a smartphone, and/or other computing platforms. In other embodiments, client computing platform(s) 128 may be a variety of electronic computing devices.

Each of the client computing platform(s) 128 may have distinct operating systems, or platforms. The client computing platform(s) 128 may be executing the same platform or the client computing platform(s) 128 may be executing different platforms. The client computing platform(s) 128 may be capable of executing multiple platforms. In some embodiments, client computing platform(s) 128 may be used by a software developer, user and/or other system administrator to control the server 102, over a network 132. In other embodiments, client computing platform(s) 128 may be targeted to receive test modules to execute.

A user may interact with a user interface that resides directly on the server(s) 102 for system administration and control. In other embodiments, client computing platform(s) 128 may be used to remotely conduct system administration. A given client computing platform(s) 128 may include one or more processor(s) 104 configured to execute computer program modules.

The external resource(s) 130 may include sources of information, hosts and/or providers of environments outside of system 100, external entities participating with system 100, and/or other resources. In some implementations, some or all of the functions attributed herein to external resource(s) 130 may be provided by resources included in system 100.

The network 132 may comprise any common communication architecture that facilitates communication between computing devices, which in this embodiment the computing devices would be the server(s) 102 and the client computing platform(s) 128. One having ordinary skill in the art would appreciate that the network 132 may be the Internet, a private intranet, or some hybrid of the two.

Figure 2:
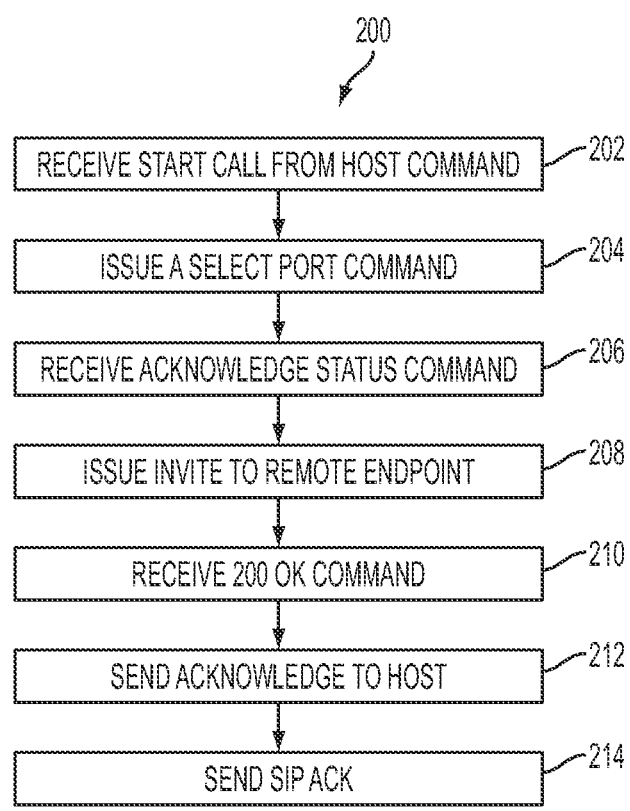
FIG. 2 illustrates a flow chart showing steps for a method for implementing DSS signaling, according to an exemplary embodiment.

FIG. 2 illustrates a flow chart 200 showing steps for a method of implementing DSS signaling, according to an exemplary embodiment. In some embodiments, the method for implementing DSS signaling, may be accomplished with one or more additional steps not described, and/or without one or more of the steps discussed. Additionally, the order in which the steps of the method for implementing a distributed silo signaling, are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the steps of method 200 in response to instructions stored electronically on an electronic storage medium. The one or more processing devices may include one or more devices configured through hardware, firmware, and/or software to be specifically designed for execution of one or more of the steps of method 200.

At step 202, the signaling server may receive from the host server, by way of the host interface module 106, a command to start a call containing a group field and NIU id. In some implementations, step 202 may be performed by a host interface module the same as or similar to host interface module 106 (shown in FIG. 1 and described above).

At step 204, the signaling server may issue a select port command to a media server defined by the NIU id. In some implementations, step 204 may be performed by a select port module the same or similar to select port module 108 (shown in FIG. 1 and described above).

At step 206, the signaling server may receive from the media server, an acknowledge status of port selection and removal of the selected port from an available port list. The acknowledgment of port selection is based on acknowledge fields which identify the call by transaction id, NM id, Prim id, channel and call tag.

The transaction identifier may be used to correlate the Acknowledgement message to the corresponding Start Port request, to differentiate multiple requests. This same transaction id must be echoed back by the media server software in the Acknowledgement response. This also will be used to correlate waiting Invites with now mated Start Port Acknowledgements which will contain the assigned Prim Id and Channel Id for a call.

The NIU id field indicates the NIU id of the media server port. This value may align with the configured media servers on the signaling server as part of provisioning. This field conjunction with the Prim id and Channel fields may combine to form the unique port identifier used by the media server software to configure a particular resource. For an incoming call, a media server must cyclically be selected. The selected media server id in this field may be placed. For an outgoing call, the media server previously obtained in the Select Port Acknowledge is used, and then that media server id is placed in this field.

The Prim id one byte field indicates the Prim slot (logical slot) address of the media server port. For outgoing calls, this field must contain the Prim field received in the Select Port Acknowledge. For Incoming calls, this field may be set to 00h.

The Channel one byte field indicates the Prim channel of the media server port. For outgoing calls, this field must contain the Channel field received in the Select Port Acknowledge. For Incoming calls, this field may be set.

In some implementations, acknowledgement of port selection removes the selected port from an available port list, and the acknowledgement of the start port command is success to continue.

In other implementations, the acknowledgement of the start port command may be a failure and the call is no longer active. The signaling server may receive from the media server, a second port selection. The signaling server may transmit a second start port command to the media server. The signaling server may receive a second acknowledgment from the media server.

The Acknowledge message may sent by the media server in response to a Start Port, Select Port, Modify Port, Stop Port, or Reset Port command. The message may also contain ip address and port number used by the specified media server port for audio sessions.

The Start Port message operation is sent by a client to command the media server to establish media stream with a remote device. Several message attributes are provided so that the media server can configure various media session parameters. For an incoming call, this message will also serve as a port allocation request, for the case in which information has been received with the invite. For an outgoing call, this message can follow successful acknowledgement of a Select port command.

The Select Port message operation is sent by a client to command the media server for an incoming or outgoing call to select a port without actually starting a media stream. For an incoming call, this message need only be called in the case in which no information has been received with the invite. Several message attributes are provided so that the media server uses them to guide the port selection.

The Modify Port operation is sent by a client whenever any configuration parameter on a media stream needs to be modified. Parameter descriptions are the same as for the Start Port operation. This message is invalid if the port has not previously been started using the Start. Port operation.

The Stop Port operation is sent by a client to terminate a media stream. Stop Port does not free the media server port so it remains unavailable for a new call. Some use cases require the ability to stop media, while still keeping the port reserved for later reconnection.

The Reset Port operation is sent by a to force a media server port to an idle state, regardless of the current state of the port.

The Free Port operation is sent by a client to stop a media stream (if it has not previously received a Stop Port) and free the media server port, making it available for another call. Only upon receipt of a CAP Host Terminate Op or Terminate Op [Ack] (Network Terminate Acknowledge), must the Free Port command be called to free the media port for future use.

The Acknowledge message is also sent by the Client in response to a Change Media Type, or Reset message. The transaction identifier for this response must match the transaction number sent in the corresponding command. If the media server is expected to select a Prim id and Channel as a result of a Start or Select Port command that has NULL values for these parameters, the Acknowledgment will contain the Prim id and Channel that has been selected by the media server for this operation. A status code is sent to indicate the success or failure of the associated operation. A non-zero status code can be used to indicate in more detail the cause of the failure.

For example, an Acknowledge message for a Reset Port, Select Port, or Stop Port message contains IP address and port number used for audio sessions. An Acknowledge message for a Start Port or Modify Port message contains IP address and port number used for the media session specified in the Start Port/Modify Port message. An Acknowledge message for a Change Media Type message has added additional Status values to aid the media server in distinguishing local/remote glare and on-fatal race conditions that can be encountered in the modify port scenarios. An Acknowledge message with a particular status implies that a Request with a specific Port triplet (NIU, PRIM, Channel) has failed due to the port being invalid (configuration issue) or the Port is already in use by another call.

In some implementations, the signaling server may establish a second RTP session stream between the media server and the remote endpoint using the selected second port, wherein the second port may be selected from a list of available ports. In some implementations, step 206 may be performed by modules the same or similar to modules 106, 108, 110, 112, 114, 116, 120, and 122 (shown in FIG. 1 and described above).

At step 208, the signaling server may issue an invite command to a remote endpoint where the SIP protocol is executed. In some implementations, step 208 may be performed by an invite module the same or similar to invite module 110 (shown in FIG. 1 and described above).

At step 210, the signaling server may receive from the remote endpoint, an ok command indicating that the SIP call has been answered by the remote endpoint. In some implementations, step 210 may be performed by an invite module the same or similar to invite module 110 (shown in FIG. 1 and described above).

At step 212, the signaling server may transmit to the host server an acknowledgment operation indicating the outbound call has been answered. In some implementations an RTP stream may be established between the media server and the endpoint after the acknowledge module has been executed. In some implementations, after execution of the acknowledge module, the signaling server may receive from the host server, a command to end the call including the resource, NIU id, Prim id, channel, tag and signaling NIU indicating which port to terminate. In some implementations, step 212 may be performed by an acknowledge module the same or similar to acknowledge module 114 (shown in FIG. 1 and described above).

At step 214, the signaling server may receive to the remote endpoint, an acknowledgement that the SIP call has been answered by the remote endpoint and thereby established. In some implementations, step 214 may be performed by an acknowledge module the same or similar to acknowledge module 114 (shown in FIG. 1 and described above).

In some implementations, the signaling server may receive from the media server, a failure indication in the status field, reissue, by the signaling server, a select port command to a second media server defined by the NIU id; and receive, by the signaling server from the second media server, an acknowledge status of port selection and removal of the selected port from an available port list. In some implementations, this step may be performed by a select port module 108 (shown in FIG. 1 and described above).

In some implementations, the signaling server may transmit a start port command based on the select port command to the media server. The signaling server may receive from the media server, an acknowledgement of the start port command, and establish a RTP session stream between the media server and the remote endpoint using the selected port.

In some implementations, the signaling server may receive from the remote endpoint, an answer Primitive command. The signaling server may send the answer Primitive command to the host server. The signaling server may send an acknowledgment of the answer Primitive command to the remote endpoint.

In some implementations, after execution of the invite module, the signaling server may establish and RTP session between the remote endpoint and the media server by sending from the remote endpoint to the media server a start port command containing the resource, NIU id, Prim id, selected Channel, call tag and signaling NIU, in some implementations, this step may be performed by a start port module 112 (shown in FIG. 1 and described above).

In some implementations, after receiving by means of the host interface module 106 (shown in FIG. 1 and described above), a request to complete a call, the signaling server may send to the media server, a free port command returning the port to the available list, and receive, by the signaling server from the media server, an acknowledge command identifying the call by transaction ID, NIU id, Prim id, channel, and call tag. In some implementations, this step may be performed by a free port module 120 (shown in FIG. 1 and described above).

Figure 3:
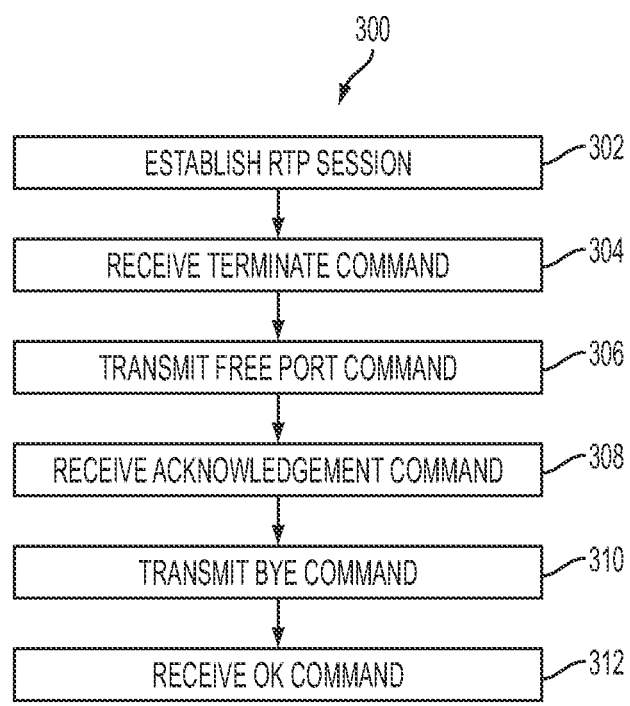
FIG. 3 illustrates a flow chart showing steps for a method for implementing DSS signaling, according to an exemplary embodiment.

FIG. 3 illustrates a flow chart 300 showing steps for a method of implementing DSS signaling, according to an exemplary embodiment. In some embodiments, the method for implementing DSS signaling, may be accomplished with one or more additional steps not described, and/or without one or more of the steps discussed. Additionally, the order in which the steps of the method for implementing DSS, are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the steps of method 300 in response to instructions stored electronically on an electronic storage medium. The one or more processing devices may include one or more devices configured through hardware, firmware, and/or software to be specifically designed for execution of one or more of the steps of method 300.

At step 302, the signaling server may receive from a remote endpoint, an invite to the remote endpoint containing the remote endpoint information needed to establish an RTP session. In some implementations, establishing a RTP session stream further comprises: receiving, by a signaling server from a host server, a command containing a group field and NIU id; transmitting, by the signaling server, a select port command to a media server based on the NIU id; receiving, by the signaling server from the media server, an acknowledgement of port selection; transmitting, by the signaling server, a command to a remote endpoint where a SIP call is executed; receiving, by the signaling server from the remote endpoint, a command indicating that the SIP call has been answered by the remote endpoint; transmitting, by the signaling server to the media server, a start port command based on the select port command; and receiving, by the signaling server from the media server, an acknowledgement of the start port command. In some implementations, acknowledgement of port selection removes the selected port from an available port list and indicates success and to continue.

In other implementations, the acknowledgement of the start port command indicates failure and the call is no longer active. The signaling server may receive a second port selection from the media server. The signaling server may transmit a second start port command to the media server. The signaling server may receive from the media server, a second acknowledgment, and establish a second RTP session stream between the media server and the remote endpoint using the selected second port, wherein the second port is selected from a list of available ports. In some implementations, the acknowledgment contains an alternate media server including a media server number, the selected Prim id and channel from the alternate media server.

In some implementations, step 302 may be performed by a combination of modules the same as or similar to modules 106, 108, 110, 112, 114, 116, 120, and 122 (shown in FIG. 1 and described above).

At step 304, the signaling server may receive a terminate command from the host server. In some implementations, the terminate command contains the NIU id, Prim id, channel, call tag, and the port to terminate. In some implementations, step 304 may be performed by a free port module the same as or similar to free port module 120 (shown in FIG. 1 and described above).

At step 306, the signaling server may transmit a free the port command from the media server. In some implementations, the free the port command frees the port and returns the port to the available port list. In some implementations, step 306 may be performed by a flee port module the same as or similar to free port module 120 (shown in FIG. 1 and described above).

At step 308, the signaling server may receive an acknowledge command from the media server. In some implementations, the acknowledge command identifies the call by transaction id, NIU id, Prim id, channel and call tag. The acknowledge command may return a status of success for a free port. In some implementations, step 308 may be performed by an acknowledge module the same as or similar to acknowledge module 114 (shown in FIG. 1 and described above).

At step 310, the signaling server may transmit a bye command to the remote endpoint, indicating the call should end. In some implementations, step 310 may be performed by a host interface module the same as or similar to host interface module 106 (shown in FIG. 1 and described above).

At step 312, the signaling server may receive an ok command indicating the bye command was received. In some implementations, step 312 may be performed by an acknowledge module the same as or similar to acknowledge module 114 (shown in FIG. 1 and described above).

Figure 4:
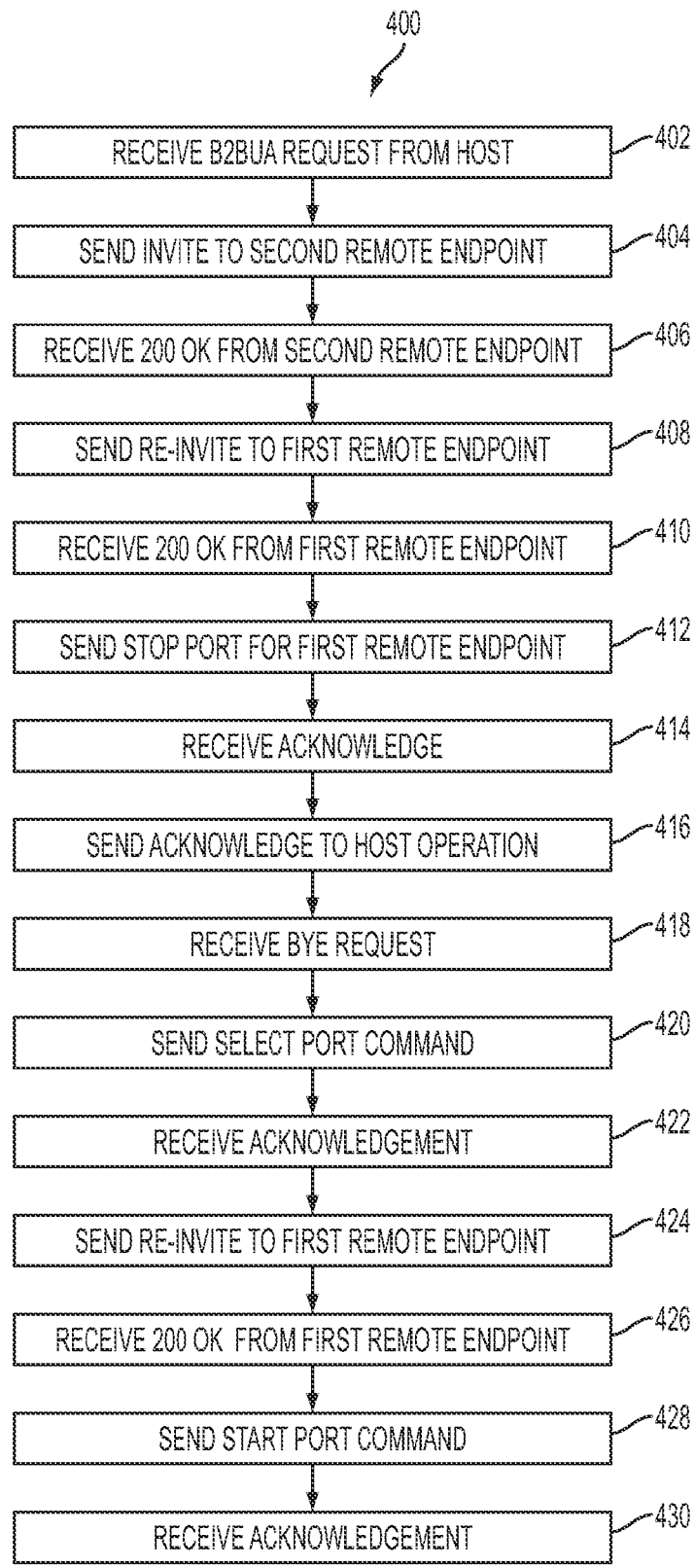
FIG. 4 illustrates a flow chart showing steps for a method for implementing DSS signaling, according to an exemplary embodiment.

FIG. 4 illustrates a flow chart 400 showing steps for a method of implementing DSS signaling, according to an exemplary embodiment. In some embodiments, the method for implementing DSS signaling, may be accomplished with one or more additional steps not described, and/or without one or more of the steps discussed. Additionally, the order in which the steps of the method for implementing DSS, are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the steps of method 400 in response to instructions stored electronically on an electronic storage medium. The one or more processing devices may include one or more devices configured through hardware, firmware, and/or software to be specifically designed for execution of one or more of the steps of method 400.

At step 402, a signaling server may receive from a host server, a B2BUA operation request identifying the destination address of a first remote endpoint and the media port hosting the pre-existing call with a second remote endpoint. The signaling server may establish a first RTP session stream between a media server and a first remote endpoint using a first port. The signaling server may receive from a host server, an initiate operation identifying a destination address of a second remote endpoint and the first port id. In some implementations, step 402 may be performed by host interface module the same as or similar to a host interface module 106 (shown in FIG. 1 and described above).

At step 404, the signaling server may send an invite request to initiate the call with a second remote endpoint, the invite request including media port IP address and port information. The signaling server may transmit to the second remote endpoint, a command to initiate a call with the second remote endpoint. In some implementations, step 404 may be performed by an invite module the same as or similar to invite module 106 (shown in FIG. 1 and described above).

At step 406, the signaling server may receive a 200 OK indication indicating the session initiation protocol call has been established with the second remote endpoint. In some implementations, step 406 may be performed by a B2BUA module the same as or similar to B2BUA module 122 (shown in FIG. 1 and described above).

At step 408, the signaling server may send a re-invite request to modify the call at the first remote endpoint, including media port IP address and port information. In some implementations, step 408 may be performed by a B2BUA module the same as or similar to B2BUA module 122 (shown in FIG. 1 and described above).

At step 410, the signaling server may receive an ok message indicating the session initiation protocol call has been established with the first remote endpoint. In some implementations, step 410 may be performed by a B2BUA module the same as or similar to B2BUA module 122 (shown in FIG. 1 and described above).

At step 412, the signaling server may send to the media server, a stop port command requesting stopping of the media session with the first remote endpoint and specifying the media port ID. The signaling server may transmit to the media server, a stop first port command identifying the first port id to stop the media session with the first remote endpoint. In some implementations, step 412 may be performed by a B2BUA module the same as or similar to B2BUA module 122 (shown in FIG. 1 and described above).

At step 414, the signaling server may receive an acknowledgement indication indicating the SIP call has been stopped for the first remote endpoint. The signaling server may receive from the media server, an acknowledge command indicating the media session stopped. In some implementations, step 414 may be performed by an B2BUA module the same as or similar to B2BUA module 122 (shown in FIG. 1 and described above).

In some implementations, after sending to the media server a stop port command acknowledging the stop port command with success or failure, wherein when success is indicated, continuing the call; and wherein when failure is indicated, tearing down the call.

At step 416, the signaling server may send to the host server, an acknowledgement operation indicating the call has been stopped at the first remote endpoint. In some implementations, step 416 may be performed by a B2BUA module the same as or similar to B2BUA module 122 (shown in FIG. 1 and described above).

In some implementations, after receiving, by the signaling server from the remote endpoints, an ok command indicating that the SIP call has been answered by the remote endpoints, an RTP session between both remote endpoints will be established. The signaling server may establish a second RTP session stream between the first remote endpoint and the second remote endpoint.

At step 418, the signaling server may receive a bye request from the second remote endpoint indicating the call should end. The signaling server may transmit to the media server a free the first port command and receive an acknowledge command. The free the first port command may free the first port and return the first port to the available port list. In some implementations, step 418 may be performed by a B2BUA module the same as or similar to B2BUA module 122 (shown in FIG. 1 and described above).

At step 420, the signaling server may send a select port command to the media server to request an available port. The signaling server may transmit a select port command to a media, server based on the NIU id. In some implementations, step 420 may be performed by a select port module the same as or similar to select port module 108 (shown in FIG. 1 and described above).

At step 422, the signaling server may receive an acknowledgement from the media server. The signaling server may receive an acknowledgment of port selection of a second port. In some implementations, step 422 may be performed by a acknowledge module the same as or similar to acknowledge module 114 (shown in FIG. 1 and described above).

At step 424, the signaling server may send a re-invite to the first endpoint to modify the call at the first remote endpoint; including media port IP address and port information. The signaling server may transmit a command to a remote endpoint where a SIP call is executed. In some implementations, step 424 may be performed by a B2BUA module the same as or similar to B2BUA module 122 (shown in FIG. 1 and described above).

At step 426, the signaling server may receive an ok message indicating the SIP call has been established with the first remote endpoint. The signaling server may receive from the remote endpoint a command indicating that the SIP call has been answered by the remote endpoint. In some implementations, step 426 may be performed by a B2BUA module the same as or similar to B2BUA module 122 (shown in FIG. 1 and described above).

At step 428, the signaling server may send a start port command to the media server to re-initiate the call with the first endpoint. The signaling server may transmit to the media server, a start port command based on the select port command and the second port. In some implementations, step 428 may be performed by a start port module the same as or similar to start port module 112 (shown in FIG. 1 and described above).

At step 430, the signaling server may receive an acknowledgement from the media server. The signaling server may receive from the media server, an acknowledgement of the start port command. In some implementations, acknowledgment of port selection removes the second port from an available port list. In some implementations, after sending to the media server a start port command, acknowledging the start port command with success or failure, wherein when success is indicated, continuing the call; and wherein when failure is indicated, tearing down the call. The acknowledgement of the start port command may be a success to continue. The signaling server may re-establish a RTP session stream between the media server and the first remote endpoint using the second port.

In some implementations, the acknowledgment contains an alternate media server including a media server number, the selected Prim id and channel from the alternate media server. In some implementations, step 430 may be performed by a acknowledge module the same as or similar to acknowledge module 114 (shown in FIG. 1 and described above).

Figure 5:
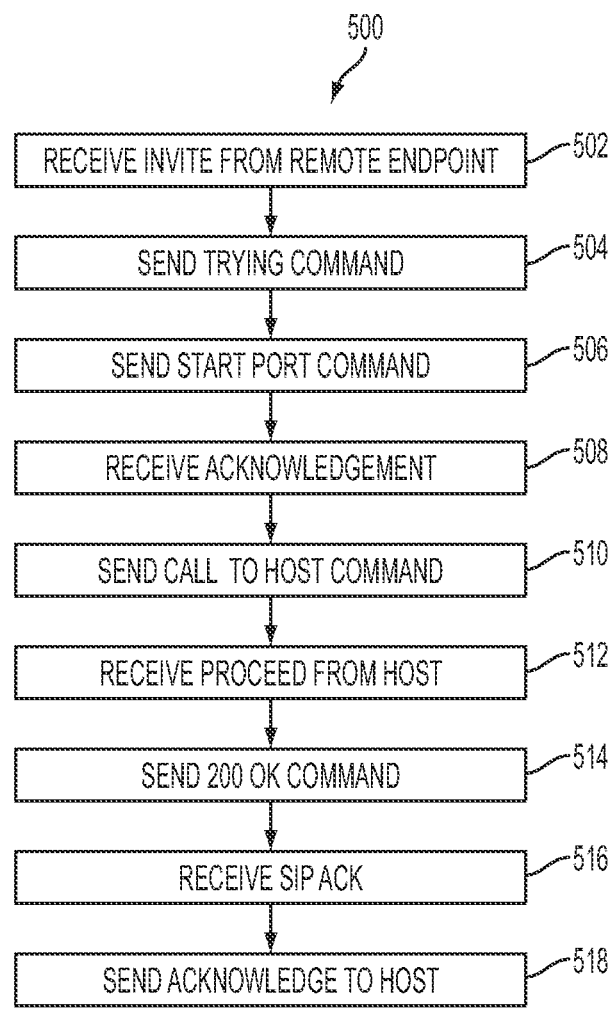
FIG. 5 illustrates a flow chart showing steps for a method for implementing DSS signaling, according to an exemplary embodiment.

FIG. 5 illustrates a flow chart 500 showing steps for a method of implementing DSS signaling, according to an exemplary embodiment. In some embodiments, the method for implementing DSS signaling, may be accomplished with one or more additional steps not described, and/or one or more of the steps discussed. Additionally, the order in which the steps of the method for implementing DSS, are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the steps of method 500 in response to instructions stored electronically on an electronic storage medium. The one or more processing devices may include one or more devices configured through hardware, firmware, and/or software to be specifically designed for execution of one or more of the steps of method 500.

At step 502, the signaling server may receive from a remote endpoint, an invite to the remote endpoint containing the remote endpoint information needed to establish a RTP session. In some implementations, step 502 may be performed by an invite module the same as or similar to invite module 110 (shown in FIG. 1 and described above).

At step 504, the signaling server may transmit to the media server, a trying command indicating that the signaling server saw the invite. In some implementations, step 502 may be performed by an invite module the same as or similar to invite module 110 (shown in FIG. 1 and described above).

At step 506, the signaling server may transmit to the media server, a command to start a port including a remote ip address and a remote port number. In some implementations, step 604 may be performed by an invite module the same as or similar to start port module 112 (shown in FIG. 1 and described above).

At step 508, the signaling server may receive from the media server, an acknowledgment comprising a transaction ID, NIU ID, Prim id, channel and call tag, and returning the port to be used for the call and a local port IP address and local port number and establishing an RTP session between the remote endpoint and the media server. In some implementations, the acknowledgement of the start port command is success to continue and/or the start port command removes the selected port from an available port list.

In other implementations, the acknowledgement of the start port command is failure and the call is no longer active. The signaling server may receive from the media server, a second port selection. The signaling server may transmit to the media server, a second start port command. The signaling server may receive from the media server, a second acknowledgment. The signaling server may establish a second RTP session stream between the media server and the remote endpoint using the selected second port, wherein the second port is selected from a list of available ports. In some implementations, step 508 may be performed by a start port module the same as or similar to start port module 112 (shown in FIG. 1 and described above).

At step 510, the signaling server may transmit to the host server, a command indicating an incoming call which needs to be answered by an application running on the host. In some implementations, step 510 may be performed by an host interface module the same as or similar to host interface module 106 (shown in FIG. 1 and described above).

At step 512, the signaling server may receive an answer from the host server to the call. In some implementations, step 512 may be performed by a proceed with call module the same as or similar to proceed with call module 116 (shown in FIG. 1 and described above).

At step 514, the signaling server may send to the remote endpoint, an ok command indicating that the call has been approved by the host server. In some implementations, step 514 may be performed by a proceed with call module the same as or similar to proceed with call module 116 (shown in FIG. 1 and described above).

At step 516, the signaling server may receive from the remote endpoint, an acknowledgment of the call answered by the host server. In some implementations, the acknowledgment contains an alternate media server including a media server number, the selected Prim id and channel from the alternate media server. In some implementations, step 516 may be performed by a proceed with call module the same as or similar to call module 116 (shown in FIG. 1 and described above).

At step 518, the signaling server may transmit an answer to the host server, the answer indicating the acknowledgment from the remote endpoint. In some implementations, the signaling server may establish a RTP session stream between the media server and the remote endpoint of the selected port. In some implementations, step 518 may be performed by host interface module the same as or similar to host interface module 106 (shown in FIG. 1 and described above).

In some implementations, the signaling server may receive from the remote endpoint, a bye command indicating the remote endpoints wants to terminate the call; send, by the signaling server to the host server, a command to end the call primitive command containing the NIU ID, Prim id, channel, resource, and call tag; and send, by the signaling server to the remote endpoint, an ok command indicating the signaling server received the bye command. In some implementations, this step may be performed by a host interface module the same as or similar to host interface module 106 (shown in FIG. 1 and described above).

In some implementations, a signaling server may receive from the host server, a command indicating the call has been terminated. In some implementations, this step may be performed by a host interface module the same as or similar to host interface module 106 (shown in FIG. 1 and described above).

In some implementations, the signaling server may send to the media server, a free port command after receiving a command indicating that the call has completed from the host server; and receive, by signaling server from the media server, an acknowledge command indicating the call by transaction ID, NIU ID, Prim id, channel and call tag, and returning the port to the available list.

The Free Port operation is sent by a client to stop a media stream (if it has not previously received a Stop Port) and free the media server port, making it available for another call. Only upon receipt of a CAP Host Terminate Op or Terminate Op [Ack] (Network Terminate Acknowledge), the Free Port command must be called to free the media port for future use. In some implementations, this step may be performed by a free port module the same as or similar to free port module 120 (shown in FIG. 1 and described above).

Figure 6:
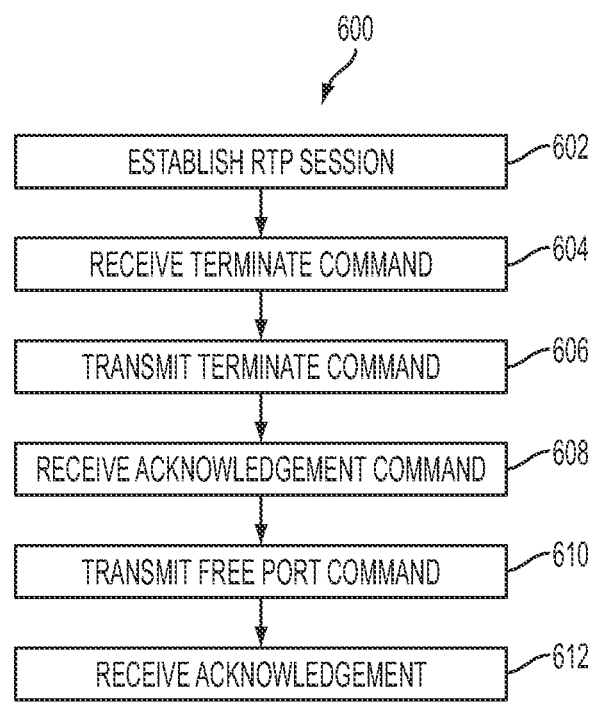
FIG. 6 illustrates a flow chart showing steps for a method for implementing DSS signaling, according to an exemplary embodiment.

FIG. 6 illustrates a flow chart 600 showing steps for a method of implementing DSS signaling, according to an exemplary embodiment. In some embodiments, the method for implementing DSS signaling, may be accomplished with one or more additional steps not described, and/or without one or more of the steps discussed. Additionally, the order in which the steps of the method for implementing DSS, are illustrated in FIG. 6 and described below is not intended to be limiting.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the steps of method 600 in response to instructions stored electronically on an electronic storage medium. The one or more processing devices may include one or more devices configured through hardware, firmware, and/or software to be specifically designed for execution of one or more of the steps of method 600.

At step 602, the signaling server may establish a RTP session stream between the media server and the remote endpoint using a port. In some implementations, establishing the RTP session stream between the media server and the remote endpoint using a port further comprises: receiving, by a signaling server from a remote endpoint, an invite to the remote endpoint containing the remote endpoint information needed to establish a RTP session; transmitting, by the signaling server to a media server, a command to start a port including a remote ip address and a remote port number; transmitting, by the signaling server to the remote endpoint, a command indicating the signaling server viewed the invite; receiving, by the signaling server from the media server, an acknowledgement of the start port command and returning the port to be used for a call; transmitting, by the signaling server to the host server, an command indicating the call to be answered by an application running on the host; and receiving, by the signaling server from the host server, an answer to the call. In some implementations, step 602 may be performed by a combination of modules the same as or similar to modules 106, 108, 110, 112, 114, 116, 120, and 122 (shown in FIG. 1 and described above).

At step 604, the signaling server may receive from the remote endpoint, a terminate call command to terminate the call. In some implementations, this step may be performed by a free port module the same or similar to free port module 120 (shown in FIG. 1 and described above).

At step 606, the signaling server may transmit to the host server, a terminate command containing a call data. The call data may comprise: NIU id, Prim id, a channel, a resource, and a call tag. In some implementations, this step may be performed by a free port module the same or similar to free port module 120 (shown in FIG. 1 and described above).

At step 608, the signaling server may receive from the host server, a command indicating the call has been terminated. In some implementations, this step may be performed by a free port module the same or similar to free port module 120 (shown in FIG. 1 and described above).

At step 610, the signaling server may transmit to the media server, a free port command to free the port. The free the port command may free the port and return the port to the available port list. In some implementations, this step may be performed by a free port module the same or similar to free port module 120 (shown in FIG. 1 and described above).

At step 612, the signaling server may receive from the media server, an acknowledgement command. In some implementations, the acknowledgment command contains an alternate media server including a media server number, the selected Prim id and channel from the alternate media server. The acknowledge command may return a status of success the port was freed. The acknowledgment is based on acknowledge fields which identify the call by transaction id, NIU id, Prim id, channel and call tag.

In some implementations, the acknowledgement of the start port command is failure and the call is no longer active. The signaling server receives from the media server, a second port selection. The signaling server transmits to the media server, a second start port command. The signaling server receives from the media server, a second acknowledgment. The signaling server establishes a second RTP session stream between the media server and the remote endpoint using the selected second port, wherein the second port is selected from a list of available ports.

In some implementations, the signaling server may further transmit to the remote endpoint, a command indicating the call ended and receive from the remote endpoint, an ok command indicating the command was received. In some implementations, this step may be performed by an acknowledge module the same or similar to acknowledge module 114 (shown FIG. 1 and described above).

Figure 7:
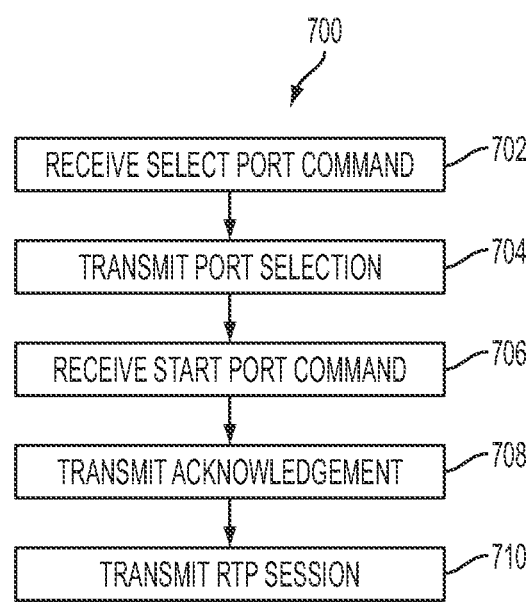
FIG. 7 illustrates a flow chart showing steps for a method for implementing DSS signaling, according to an exemplary embodiment.

FIG. 7 illustrates a flow chart 700 showing steps for a method of implementing DSS signaling, according to an exemplary embodiment. In some embodiments, the method for implementing DSS signaling, may be accomplished with one or more additional steps not described, and/or without one or more of the steps discussed. Additionally, the order in which the steps of the method for implementing DSS, are illustrated FIG. 7 and described below is not intended to be limiting.

In some embodiments, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the steps of method 700 in response to instructions stored electronically on an electronic storage medium. The one or more processing devices may include one or more devices configured through hardware, firmware, and/or software to be specifically designed for execution of one or more of the steps of method 700.

At step 702, the media server receives from a signaling server, a select port command based on a NIU id. In some implementations, this step may be performed by a select port module the same or similar to select port module 108 (shown in FIG. 1 and described above).

At step 704, the media server may transmit a port selection to the signaling server. In some implementations, this step may be performed by a select port module the same or similar to select port module 108 (shown in FIG. 1 and described above).

At step 706, the media server may receive a start port command from a signaling server. In some implementations, this step may be performed by a start port module the same or similar to start port module 112 (shown in FIG. 1 and described above).

At step 708, the media server may transmit an acknowledgment to the signaling server. In some implementations, the acknowledgment may contain an alternate media server including a media server number, the selected Prim id and channel from the alternate media server. In some implementations, this step may be performed by an acknowledge module the same or similar to acknowledge module 114 (shown in FIG. 1 and described above).

At step 710, the media server may transmit to a remote endpoint, a RTP session stream between the media server and the remote endpoint using the selected port. In some implementations, the media server may further determine a port failure, wherein a port failure indicates the port is no longer active. The media server may stop the port and return the port to a list of available ports. In some implementations, the media server may stop the port and change the status of the port to invalid and/or unusable. The media server may transmit to the signaling server, a second port selection, and receive a second start port command from the signaling server. The second port may be selected from a list of available ports. The media server may transmit to the signaling server, a second acknowledgment. The media server may transmit to a remote endpoint, a second RTP session stream between the media server and the remote endpoint using the selected second port. In some implementations, step 710 may be performed by a combination of modules the same as or similar to modules 106, 108, 110, 112, 114, 116, 120, and 122 (shown in FIG. 1 and described above).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Figure 8A:
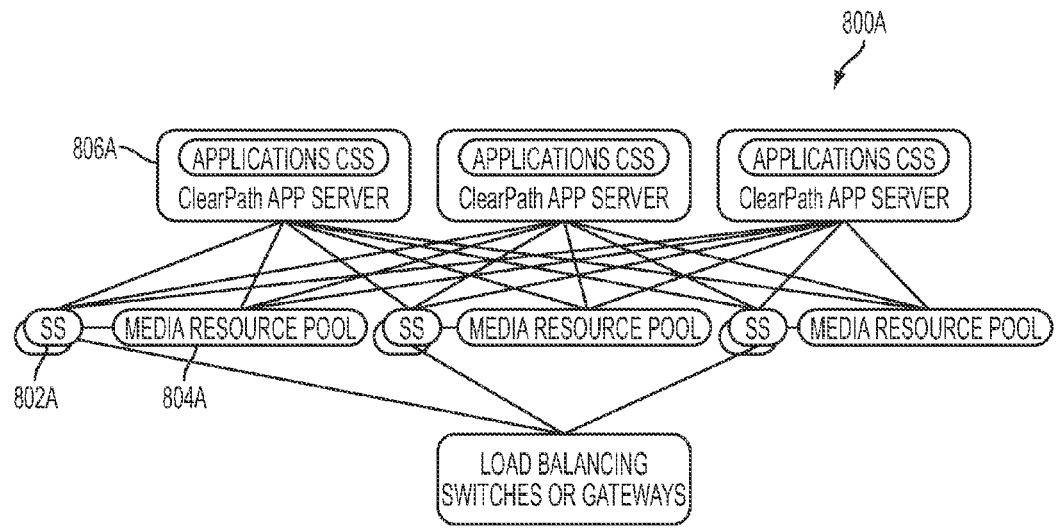
FIG. 8A illustrates a diagram of a system architecture for implementing DSS signaling, according to an exemplary embodiment.

FIG. 8A illustrates a diagram of a system architecture 800A for implementing DSS signaling, according to an exemplary embodiment. In some embodiments, the method and/or system for implementing DSS signaling, may be accomplished with one or more additional steps not described, and/or without one or more of the steps discussed. Additionally, the order in which the system elements for implementing DSS signaling as illustrated in FIG. 8A and described below is not intended to be limiting.

The purpose of the DSS is to allow sharing of a pool of NIUs, both media and signaling, across multiple communications applications platform (CAP) systems. This allows continued application access to all IP media resources when a signaling server fails. In an exemplary embodiment, FIG. 8A illustrates sharing of signaling servers 802A and media resources 804A by application servers 806A using the existing "shared NIU" feature without DSS. Each signaling server 802A manages a set of media resources 804A. For example, if a signaling server 802 fails, the associated media resources 804A are unusable by applications.

Figure 8B:
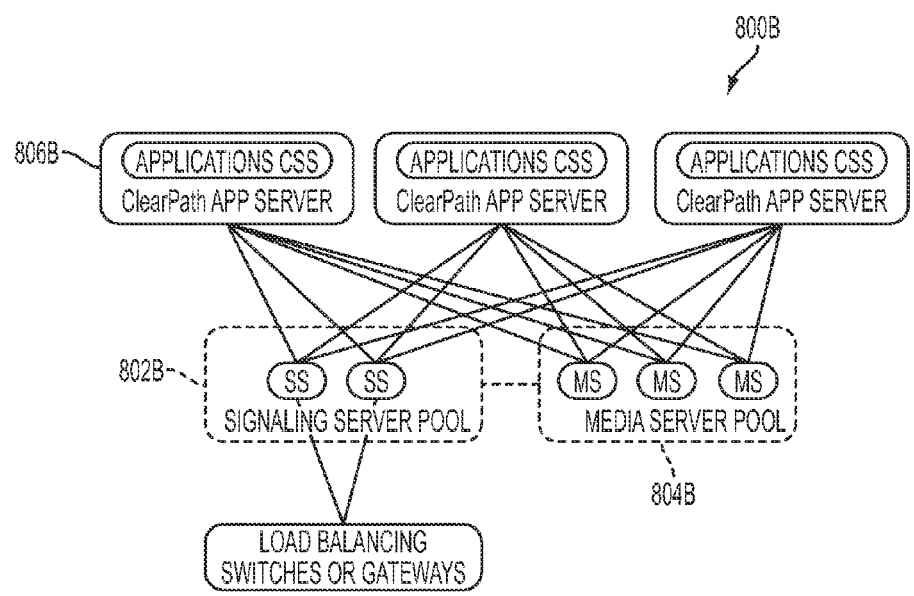
FIG. 8B illustrates a diagram of a system architecture for implementing DSS signaling, according to an exemplary embodiment.

FIG. 8B illustrates a diagram of a system architecture 800B for implementing DSS signaling using the existing "shared NIU" feature according to an exemplary embodiment. In some embodiments, the method and/or system for implementing DSS signaling, may be accomplished with one or more additional steps not described, and/or without one or more of the steps discussed. Additionally, the order in which the system elements for implementing DSS signaling as illustrated in FIG. 5B and described below is not intended to be limiting.

The DSS architecture exemplified in FIG. 8B resembles that described in FIG. 8A except that media resources 804B remain available to all applications 8069 if one of the signaling servers 8029 fails. In order to share the media, the operations are changed. Since more than one signaling module requests ports on any given media server 804B, port selection is moved from the signaling module 802B to the media servers 804B. Each media server 804B may control its own media, in an exemplary embodiment, for an outbound call, the application server will send the signaling server a command containing a resource group (RG) designating which media server 804B will use to support the call. The media server 804B will receive the RG so it can determine which ports may support the call. In some implementations, a signaling server reselects a media server 804B for various reasons such as when there are no available port resources at a selected media server 804B. For incoming calls this can occur after a start port command that cannot be satisfied. For outbound calls this can occur when a select port command cannot be satisfied. Signaling server maintains a list of media servers 804B that support the needs of the call (codec, etc.) or for outgoing calls the next media server in its list. Signaling server does not have any information about RGs. For incoming calls, signaling server chooses the next media server 804B in the list with no regard to RG. For outgoing calls, signaling server chooses the media server selected by the application host, passing the RG information to the media server. The media server 804B will be the single point of port selection for both incoming and outgoing calls to eliminate glare as much as possible.

Figure 9A:
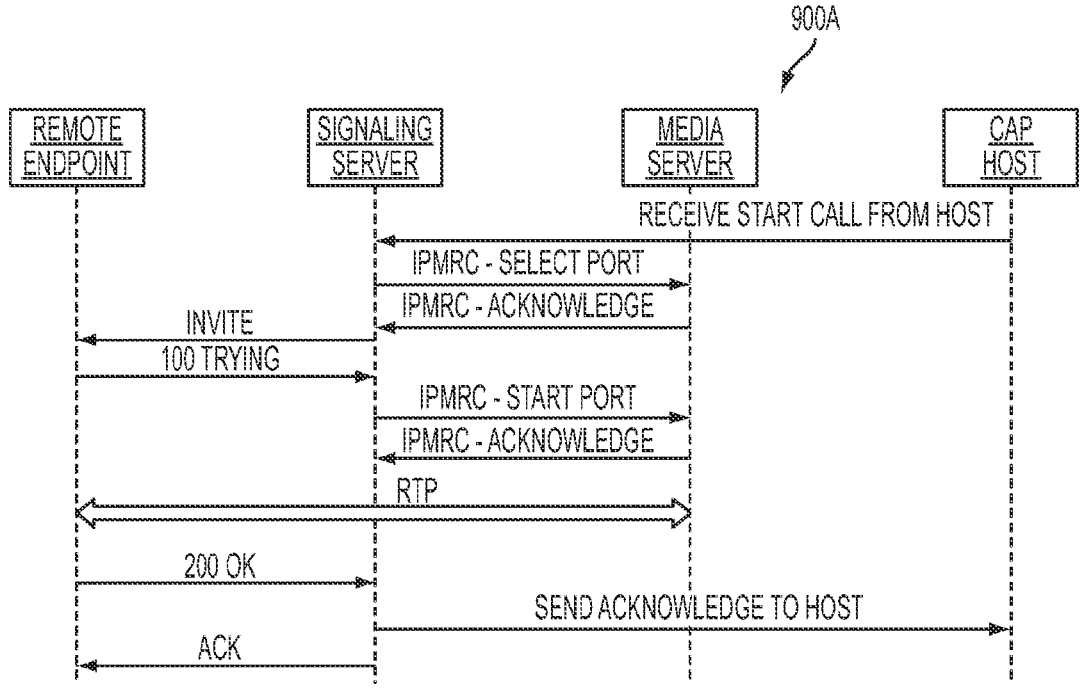
FIG. 9A illustrates a flow diagram of an architecture for implementing DSS signaling, according to an exemplary embodiment.

FIG. 9A illustrates a flow diagram of an architecture 900A for implementing DSS signaling, according to an exemplary embodiment. In some embodiments, the method and/or system for implementing DSS signaling, may be accomplished with one or more elements not described, and/or without one or more of the elements discussed. Additionally, the order in which the system elements for implementing DSS signaling as illustrated in FIG. 9A and described below is not intended to be limiting. The architecture 900A may utilize different port commands including: a reset port, a select port, a start port, a stop port, a free port, and/or any other port command.

In some implementations, a reset port command will check for DSS mode. If not DSS mode, code will work as pre-DSS, and reset the targeted port. In some implementations, in DSS implementation, an error trace will be displayed, and a "request Failed" status returned in the acknowledgement to signaling server. In some implementations, the signaling server can call into DSS Port Management code to determine validity of the port request by the signaling NIU and act accordingly. A call is made to DSS Port Management code to kick off a port use check and issue special internal stop ports for all active ports and will get an acknowledgement from the signaling server for each. The acknowledgement from the signaling server will put the respective port into the available pool.

In some implementations, a select port command will only occur with DSS mode. A call is made to the DSS Port Management code which will attempt to select a port. If no port obtained, then a "generic" port is targeted and an acknowledgement sent to signaling server with non-success for this Select Port. If a port is obtained, the call to the appropriate port will now be made and the port state will be changed to "selected". An acknowledgement (Ack) with "success" for this Select Port is sent.

In some implementations, a start port command will check for wild-card Prim/Channel. If no specific port was targeted, a call to the DSS Port Management code will attempt to select a port. If no port is obtained, a "generic" port is targeted and sends an acknowledgement to signaling server with non-success status for this Start Port. If a port is obtained or the start port specified a port, the call to the appropriate port identified will be made and the port will be started and state will be changed to "started". An Ack with "success" for this Start Port is sent.

In some implementations, a stop port command will target a port unless the call has hung up before signaling server received an acknowledgment for a Start Port for an incoming call, in which case the Start Port acknowledgment would have identified the port to signaling server. In this case, only the call Tag can identify a selected port, so the signaling server must call into DSS Port Management to search for a selected port. In the nominal case, the call to the appropriate port will be made and the port will be stopped and state will be changed to "stopped". The targeted port sends an Acknowledgement (nominally with "success") for this Stop Port. This port may be started at a later point and time. For the hang-up case, in which no port had been successfully selected, the generic port instance not a port specific instance, will generate the acknowledgement back to signaling server.

In some implementations, a free port command will target a port unless the call has hung up before signaling server received an acknowledgement for a Select Port or Start Port which would have identified the port to signaling server. In the nominal case, the call to the appropriate port will be made and the port will be stopped and state will be changed to "stopped". A request will be made to DSS Port Management code to free the port. The targeted port sends acknowledgement (nominally with "success") for this Free Port. Signaling server has completed the call with this port and it has been returned to the available pool. For the hang-up case, in which no port had been successfully selected, the generic port instance, not a port specific instance, will generate the acknowledgement back to signaling server.

In some implementations, the CAP host may initiate the actions. An NIU managed RG may always be specified (non-zero) with the outgoing call initiation. A valid target (non-zero) media NIU may always be specified with the outgoing call. An NIU managed RG must not span more than one media server, but rather must be contained within one media server. The media server can have up to 255 RGs defined. A Prim can be divided across multiple NIU managed RGs. A port may not belong to more than one NIU managed RG In some implementations, the Communication System Software (CSS) may initiate a call from the CAP Host which is received by the signaling server. The request may contain the NIU Managed Resource group field and telephone services platform identification (NIU id). Other fields, such as flags, may describe the attributes needed for the call.

In some implementations, signaling server may detect that this is an Outbound call. This can be done in several ways (e.g., through examination of the Call Tag and a Non-Zero Resource field). In some implementations, since there is no port defined, signaling server will issue a Select Port Command over the interface from the signaling server to the media server defined by the NIU id. The media server is responsible for calling into the Port Selection algorithm and returning a selected port to the signaling server. If it can return a port, then the Acknowledgement Status will indicate success. The media server will remove the selected Port from the Available list.

In some implementations, the Acknowledgement fields identify the call by Transaction id, NIU id, Prim id, Channel and Call Tag. On Success, the Acknowledgement will return the Port to be used for this call. The Acknowledgement Status field will indicate Success from the media server to the signaling server, otherwise, the Acknowledgement will return a failure indication in the Status field. In that case signaling server will fall into an alternate flow to handle the error and either retry another media server or fail the Call.

In some implementations, once signaling server has the Port, including the media server Local IP Address and Local Port, it can issue the Invite from the signaling server to the Remote Endpoint via the network where the SIP protocol is executed. In response, the Remote Endpoint may send a trying command to the signaling server.

In some implementations, a Start Port command containing all the Port information from the network side port (e.g., Remote_IpAddr and Remote_IpPort) is sent to the media server from the signaling server. This command may contain the Resource, NIU id, Prim id, Channel that was selected, Call Tag, and Signaling NIU, The RTP Session may be established.

In some implementations, the Start Port command is acknowledged with Success or failure (e.g., Success=Continue; Failure=Tear down the call) from the media server to the signaling server. An RTP session may be established between the Remote Endpoint and the media server. The Remote Endpoint may send an ok indication which indicates that the SIP call has been answered by the network side endpoint to the signaling server.

In some implementations, a command may be sent from the signaling server to the CAP Host indicating that the Outbound call has been answered and the Outbound call is established. The signaling server may send an Acknowledgment command to the Remote Endpoint.

In some implementations, should the call not be answered or time out by the network, the network, host or signaling server will execute procedures to tear down the call.

Figure 9B:
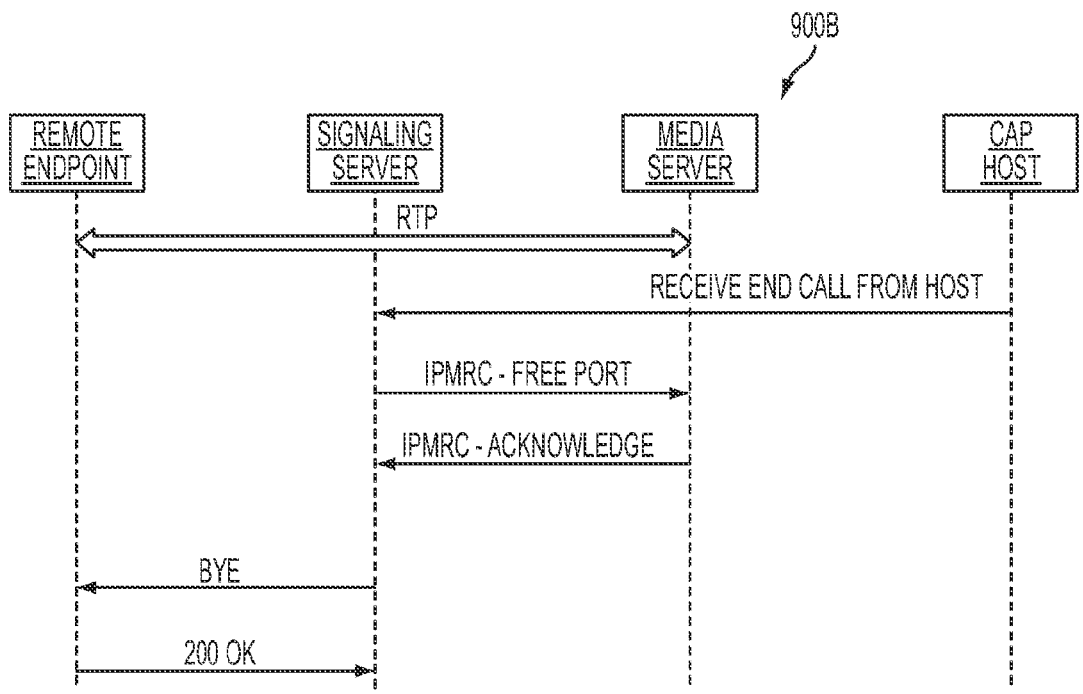
FIG. 9B illustrates a flow diagram of an architecture for implementing DSS signaling, according to an exemplary embodiment.

FIG. 9B illustrates a flow diagram of an architecture 900B for implementing DSS signaling, according to an exemplary embodiment. In some embodiments, the method and/or system for implementing DSS signaling, may be accomplished with one or more elements not described, and/or without one or more of the elements discussed. Additionally, the order in which the system elements for implementing DSS signaling as illustrated in FIG. 9B and described below is not intended to be limiting. The architecture 900B may utilize different port commands including: a reset port, a select port, a start port, a stop port, a free port, and/or any other port command.

In some implementations, an outbound call from the CSS on the CAP host to the Network may be initiated. An active call may exist and an RTP stream may established between the media server and the Network. A command to end the call may be sent by CSS on the CAP Host to the signaling server with the Resource (if known), NIU id, Prim id, Channel, Tag, and Signaling NIU indicating which specific Port/Call to terminate.

In some implementations, signaling server may issue an Free Port command to the media server from the signaling server after seeing the request to end the call from the Host that is handling this triplet and Call Tag. The media server unconditionally stops the port as it would for a Stop Port command. The media server returns the Port to the available list. The media server sends an Acknowledgement to the signaling server.

In some implementations, the Acknowledgement fields identify the call by Transaction id, NIU id, Prim id, Channel and Call Tag, signaling server only expects to get a status of success for a Free Port. A Bye command may be sent to Network side to indicate that the call should end from the signaling server to the Remote Endpoint. An ok command may indicate the Bye was received by the Network side sent from the Remote Endpoint to the signaling server.

Figure 10:
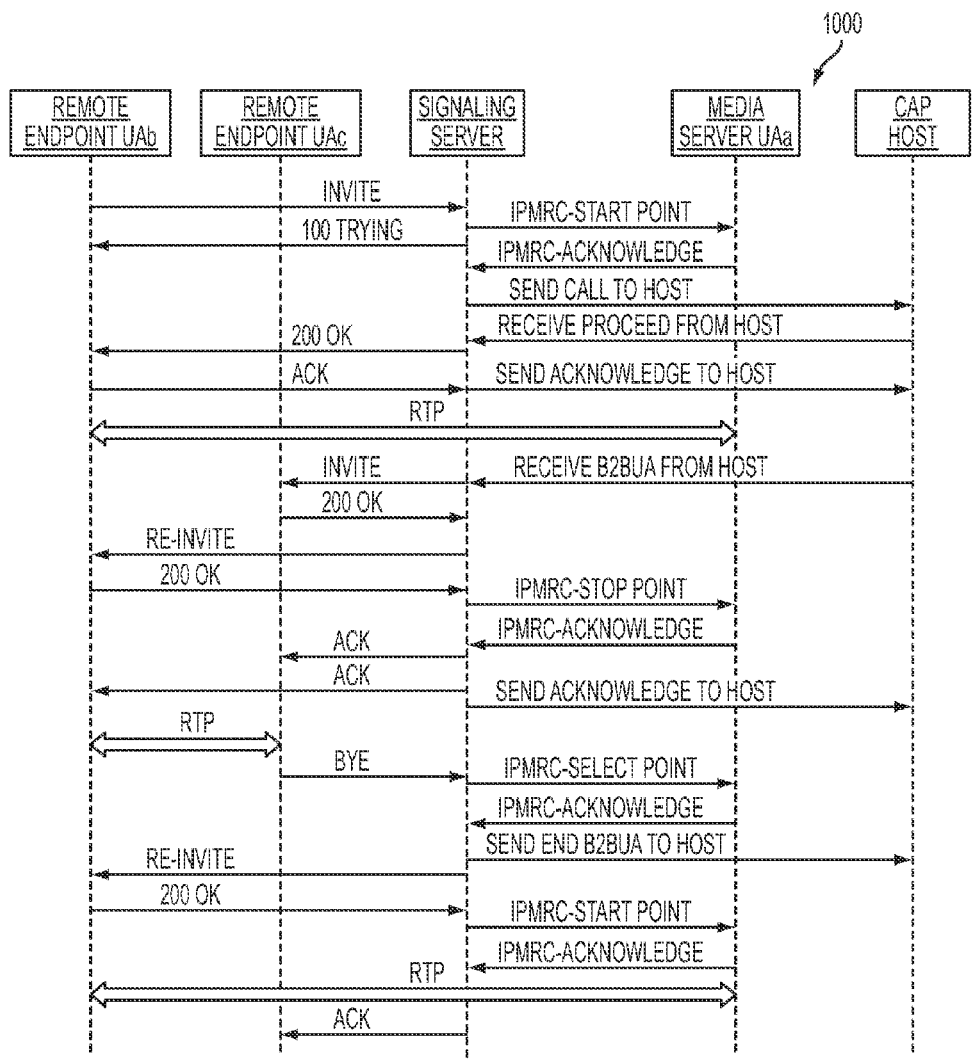
FIG. 10 illustrates a flow diagram of an architecture for implementing DSS signaling, according to an exemplary embodiment.

FIG. 10 illustrates a flow diagram of an architecture 1000 for implementing DSS signaling, according to an exemplary embodiment. In some embodiments, the method and/or system for implementing DSS signaling, may be accomplished with one or more elements not described, and/or without one or more of the elements discussed. Additionally, the order in which the system elements for implementing DSS signaling as illustrated in FIG. 10 and described below is not intended to be limiting. The architecture 1000 may utilize different port commands including: a select port, a start port, a stop port, a free port, and/or any other port command. The architecture 1000 is an exemplary implementation of the B2BUA flow connecting the UAC call leg with SIP details showing platform port control, specifically the use of Stop Port and then Start Port to disconnect/reconnect the original call leg.

In some implementations a SIP back-to-back user agent (B2BUA) provides a means for the CAP host to manage a call (for "charging" and other reasons) in a way that while the initial call remains active, another call is established and the media flows directly between two parties, then a reconnection to the original CAP managed call occurs at the conclusion of the call. A call may be issued by the CAP Host to specify a dialing rule used to initiate a B2BUA call leg. The signaling server implementation may then retain knowledge of the initial call while managing the additional B2BUA call leg, and then upon termination of the B2BUA leg, reconnect the original call. For example, this use case describes connecting a (pre-existing) stable SIP call to a new remote endpoint and/or second remote endpoint (UAc) by initiating a second SIP call with UAc. The signaling server acts as a SIP B2BUA when executing this use case.

In some implementations, as a SIP B2BUA, the signaling server remains an active controller in all SIP messaging between user agents, performing third-party call control (3PCC) while maintaining call/dialog state. A precondition may be the signaling server has a stable SIP call established with a remote user agent and/or first remote endpoint (UAb).

In some implementations, the basic flow may be as follows:

1. signaling server may receive an B2BUA request from CSS identifying the destination address of UAc and the media port hosting the pre-existing call with UAb.

2. signaling server may send an invite operation to remote endpoint UAc containing the remote endpoint information needed to establish an RTP session with remote endpoint UAb.

3. signaling server may receive an ok command from UAc.

4. signaling server may send a re-invite operation to the call in progress with UAb including the media port IP address and port information for UAc 5. signaling server may receive an OK indication from UAb indicating the successful processing of the re-invite operation.

6. signaling server may send a Stop Port command to the media server requesting stopping of the media session (but not freeing of the media port) with UAb, specifying the media port ID. In some implementations, an alternate flow may comprise the CSS and/or signaling server ending the call.

7. media server may send an Acknowledge (status=success) to signaling server indicating the media session has stopped. In some implementations, an alternate flow may comprise the CSS and/or signaling server ending the call and/or Stop Port failure.

8. signaling server may send acknowledgements of the OK indications to UAb and UAc 9 UAb and UAC may now establish an RTP session between the two endpoints.

In some implementations, after completion of the Media session between UAb and UAc, reconnection between UAb and UAa (original call leg) will occur if UAc hangs up first.

1. signaling server may receive a bye indication from UAc signifying that UAc has hung up and is ending involvement in the call.

2. signaling server may send a Select Port operation to the media server UAa requesting a port to be used for reconnection with the original endpoint UAa.

3. The signaling server may receive an Acknowledgement of receipt of the Select Port from media server UAa containing a remote IP Address and port to be used for the connection.

4. The signaling server may send the CAP host a message indicating that the B2BUA portion of the call has ended.

5. The signaling server may send a re-invite request to UAb including the media port IP address and port information for media server UAa to reestablish the original session.

6. The signaling server may receive an ok indication from UAb acknowledging successful processing of the re-invite request.

7. The signaling server may send a Start Port operation to the media server UAa to Server UAa to start the media portion of the call between remote endpoint UAb and media server UAa.

8. The signaling server may receive an Acknowledgement of the Start. Port operation from media server UAa.

9. UAb and UAa may now establish a Media Session to continue the call.

10. The signaling server may now send an Acknowledgement to UAc to respond to the bye indication received in step 1.

In some implementations, an invite may be received by a signaling server from a Remote Endpoint, to the Remote Endpoint containing the remote endpoint information needed to establish an RTP session. The signaling server may send to the Remote Endpoint, a trying command indicating the signaling server saw the invite. The signaling server may send to a media server, a start port command including a remote ip address and a remote port number.

The signaling server may receive from the media server, an acknowledgment comprising a transaction id, NIU id, Prim id, channel and call tag, and returning the port to be used for the call and a local port ip address and local port number and establishing an RTP session between the Remote Endpoint and the media server. An RTP session may be established between the media server and the Remote Endpoint.

In some implementations, a Circuit Group Reset is initiated by the Master host and is intended to take a single circuit or group of circuits back to an inactive (NULL) call state and clear any Network Suspended circuits (Port Unusable). The Operation is sent to the media server for a specified Prim and includes a Circuit Mask. When received by the TeleServer Adaptation Layer, all indicated ports will have their state updated to inactive when actions toward Dialogic Interfaces and signaling server are complete. This same operation will be used as an Acknowledge where now the Circuit Mask will only contain a subset of the original mask for those ports that were successfully reset. The Error Mask in the Acknowledge will indicate any channels from the original mask that are not configured.

In some implementations, the Suspend Circuit Use is initiated by the Master host and is intended to take a single circuit or group of circuits out of consideration for port selection. The Op is sent to the media server for a specified Prim and includes a Circuit Mask. When received, all indicated ports will have their state updated to mark them as locally suspended. An Adaptation Layer code class will manage this operation, and provides the correct protocol exchange with the CSS host, and the flow will proceed as follows:

In some implementations, for this SIP operation, the only distinction between a Circuit Group Reset and a Suspend Immediate is that the port is not available until a Resume is processed for the case of a Suspend. For DSS, these operations are issued to media server instead of the signaling server. Depending on the value of the Terminate field, a call currently using a port being suspended will either be allowed to complete (Quiescent) or will be immediately terminated. For the Immediate case, signaling server must tear down the existing call. The ports will be handled one at a time, with each port being reset, causing a Terminate Op to be sent to CSS. Also for the Immediate case, a stop port will be processed for all indicated circuits that are not already in the stopped state, ending the current media session. For the Quiescent case, the media server will permanently Suspend a port only after the Stop port is finally received.

In some implementations, once all the Resets are sent and the circuits are removed from the port selection pool, a Suspend Circuit Use Acknowledgement Operation (Op) is sent to CSS where the Mask will identify the valid circuits that were suspended and the Error Mask will specify any channels that are not configured. All of the Resets that were sent to the signaling server instances should be acknowledged but the status (Success/Failure) will not matter so they can be ignored. As an optimization, when there are no ports remaining on a media server because the last of them have been suspended, a media server Availability command (Media Available=0) must be broadcast to all signaling server instances. This will remove the media server from future Select and Start port attempts until circuits are resumed.

In some implementations, the Resume Circuit Use is initiated by the Master host and is intended to restore a single circuit or group of circuits back into consideration for port selection. The Op is sent to the media server for a specified Prim and includes a Circuit Mask. When received by the TeleServer Adaptation Layer, all indicated ports will be updated to clear any locally suspended or quiescent suspended state.

As an optimization, when there were no ports remaining on a media server because the last of them had been suspended but now ports are being restored, a media server Availability command (Media Available=1) must be broadcast to all signaling server instances. This will return this media server for future Select and Start port attempts.

Figure 11A:
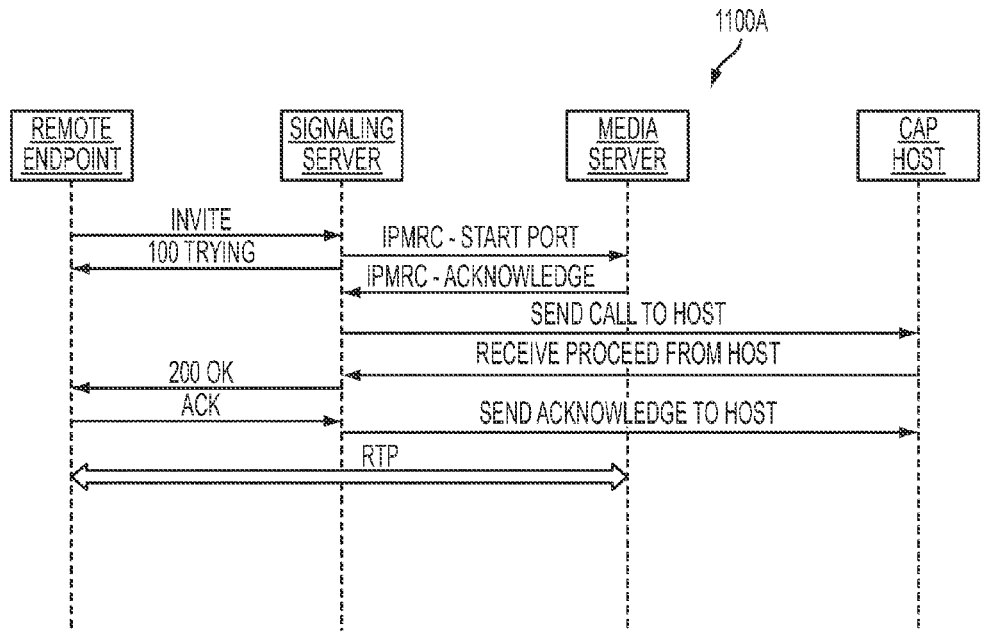
FIG. 11A illustrates a flow diagram of an architecture for implementing DSS signaling, according to an exemplary embodiment.

FIG. 11A illustrates a flow diagram of an architecture 1100A for implementing DSS signaling, according to an exemplary embodiment. In some embodiments, the method and/or system for implementing DSS signaling, may be accomplished with one or more elements not described, and/or without one or more of the elements discussed. Additionally, the order in which the system elements for implementing DSS signaling as illustrated in FIG. HA and described below is not intended to be limiting.

In some implementations, the architecture 1100A describes the steps needed to handle an inbound call from the network. Since the call is from the outside world, it will never have a Resource defined and that is a prime way to recognize an inbound call. With no Resource, the signaling server has no choice other than examining Invite attributes (e.g. Codec) to cyclically select a media server from its list. The media server uses a Port Selection algorithm (described elsewhere in this document) to pick a port and establish and RTP session.

In some implementations, an Invite arrives at the signaling server from the Network containing the Remote Endpoint information needed to establish an RTP session from the Remote Endpoint to the signaling server. The signaling server may reply with a Trying operation indicating only that it saw the Invite. Since there is no way the Network can identify a Resource, the signaling server issues a Start. Port Command to the media server including the Remote_IpAddr and Remote Port number. The Call Tag will be odd which also indicates an inbound call. The Acknowledgement fields identify the call by Transaction id, NIU id, Prim id and Channel and Call Tag. On Success, the Acknowledgement will return the Port triplet to be used for this call as well as detail for the Port's Local IpAddr and Local Port number from the media server to the signaling server. The Acknowledgement Status field will indicate Success, otherwise, the Acknowledgement will return a failure indication in the Status field. In that case signaling server will fall into an alternate flow to handle the error and either retry another media server or fail the Call. The RTP Session Starts between the Remote Endpoint and the media server.

In some implementations, an operation is sent from the signaling server to the CAP Host to indicate an incoming call that needs to be answered by an Application running on the CAP Host. The CAP Host answers the incoming call tells the signaling server to proceed with the call. The Inbound call is now established. The signaling server sends an OK. Indication to the Remote Endpoint and receives an acknowledgement from the Remote Endpoint in the SIP Network. The signaling server sends an acknowledgement to the CAP Host.

Figure 11B:
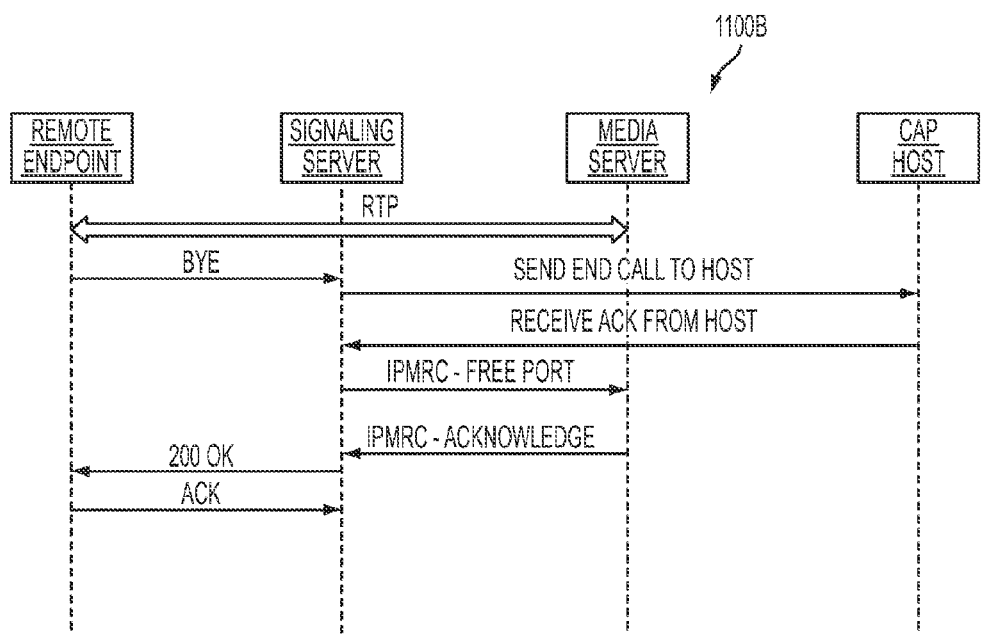
FIG. 11B illustrates a flow diagram of an architecture for implementing DSS signaling, according to an exemplary embodiment.

FIG. 11B illustrates a flow diagram of an architecture 1100B for implementing DSS signaling, according to an exemplary embodiment. In some embodiments, the method and/or system for implementing DSS signaling, may be accomplished with one or more elements not described, and/or without one or more of the elements discussed. Additionally, the order in which the system elements for implementing DSS signaling as illustrated in FIG. 11B and described below is not intended to be limiting.

In some implementations, architecture 800B exemplifies when the Network side decides to terminate a call after the call has been established. This flow has no dependency on which side initiated the call, in some implementations, an RTP session for the call is established between the Remote Endpoint and the media server. A Bye is received by signaling server from the Remote Endpoint indicating that the network endpoint of the call wants to terminate the call. The signaling server sends notification of the end of the call to the CAP host and receives an acknowledgement from the CAP host in return. The signaling server then sends a Free Port containing the call's information to the media server which proceeds to tear down the call, returns the port to the Available list and sends an Acknowledgement back to the signaling server. An ok message sent to the Remote Endpoint indicates that signaling server got the Bye command sent to the signaling server from the Remote Endpoint. The Remote endpoint may shut down. The remote endpoint sends an acknowledgement to the signaling server to indicate receipt of the ok and the call is done.

In some implementations, the CSS on the CAP 1-lost will send an operation to signaling server indicating that it has terminated the call, signaling server issues an Free Port command to the media server The media server returns the Port to the Available list. The Acknowledgement fields identify the call by Transaction id, NIU id, Prim id, Channel and Call Tag, signaling server only expects to get a Status of Success for a Free Port from the media. server.

In some implementations, for an incoming call, the signaling server may send a Start Port to a media server to request a port for the call. The media server may return an Acknowledgement indicating a failure condition (e.g., no ports available). The signaling server may then choose another media server from the plurality of connected media servers and send a Start Port to that media server to request a port. That media server may return an Acknowledgement indicating success and the appropriate port information.

In some implementations, for an incoming call, the signaling server may continue to send Start Port operations to connected media servers receiving failure conditions until either a successful Acknowledgement is received or a configured timeout period is achieved.

In some implementations, if a timeout or other failure condition is the end result—such as no available port could be found—then the signaling server will tear down the call with the remote endpoint.

In some implementations, for an outgoing call, the signaling server may send a Select Port operation to a media server to request a port for the call containing the RG to be used for the call. The media server may return an Acknowledgement indicating a failure condition no ports available). The signaling server will send an Acknowledgement indicating a failure condition to the host server which will then determine, based on application intent, whether to tear down the call or attempt to request a port from the same or another RG.

Recovery Actions

In some implementations, signaling server sends a Ping toward each of its connected media servers and they respond with an Pong. When the IP connection is broken between the signaling server and the media server, in the Non-DSS case, the media server detects the failure, closes the connection and listens for a new connection. On the signaling server side, when the connection is broken, calls must be cleaned up and Destination Point Code (DPC) Unavailable Ops are sent to the Signaling Module. For all of this must remain but now that the media server is managing port allocation, it must use the detected failure toward the one or more attached Signaling NIUs to force a stop of any active ports and then be able to return those ports to the available pool.

In some implementations, in the non-DSS case, when a command is received by a media server for a port that is not configured, an 'Invalid Port' Status is returned in the Acknowledge causing signaling server to mark the port as failed but pass this up to the Signaling Module and CSS as Network Suspended to avoid future use (Until reset). In the DSS model, media servers select the port and signaling server no longer is responsible for circuit maintenance, so while the 'Invalid Port' Status may still need to be reported to signaling server, no action need be taken other than signaling server cleaning up the call.

In some implementations, for the cases where a 'Port Unusable' Status occurs, these ports must be prevented from being used for future calls. This status was previously labeled as 'Port Unavailable' and could be reported by the media server when specific media errors occurred (media Timeout). The port is removed from any future Port, Span, and Resource Group allocation and a Suspend Op is sent from the media server to CSS. Only a Circuit Group Reset from CSS can clear this state, not a Reset command from signaling server.

In some implementations, the media server detects a host offline by detecting lack of traffic from the host. If there are voice commands at least every 5 seconds, the host is considered online, and the media server will not send any "pings". If voice traffic stops, then after waiting for 5 seconds, the media server will issue a "ping" every 6 seconds, and as long as the host responds with a "pong" within six seconds, the host is considered online. So when the media server loses communication with the host, the time to declare the host offline varies from 6 to 12 seconds (approximate values).

Since DSS may exist in a shared or non-shared environment, there are three cases for a host going offline, it is the intent of the DSS design to tie host offline conditions to the usage of media server Availability so that the connected signaling server instances will be prevented from using this media server for new calls.

Case 1. In a non-shared environment, the one and only host goes offline.

Case 2. In a shared environment, one of the many hosts goes offline, but other hosts are online.

Case 3. In a shared environment, the last remaining host goes offline.

Cases 1 and 3 can be treated very much the same way, since there is no host left to handle any calls or use the media server. Case 2 is somewhat different since there are hosts that can still use the media server and handle calls. For a shared environment, there may be series of case 2 incidents, followed by a case 3 incident where the final host goes offline. When hosts are recovered, the first host to come online will clear the case 3 condition.

For cases 1 and 3, the media server will send the "media server Availability" message to each connected signaling server instance, indicating that the media server is not available. This prevents the media server from being asked to provide any new media ports. This will be added to the list of conditions (see below) that can change the "media server Availability" state. The media server will need to keep track of the media unavailable conditions because the media server will be made unavailable if any condition occurs but will be made available again only when all are cleared. For case 2, the media server stays available to all Signaling for Linux (SFLs), and the "media server Availability" message is not sent.

In some implementations, the list of conditions may include: 1. Emergency Messaging host offline processing. This may be invoked when an NIU detects loss of communication with an application host server subject to the conditions described above.

2. Dynamic port allocation resource threshold exceeded. This may be invoked if the option to allocate ports from a pool of such ports as opposed to fixed allocation of ports is selected and the number of available ports in the pool drops below a configured threshold value.

3. Available port throttling threshold exceeded. This may be invoked if the number of ports available to be allocated for incoming and outgoing calls drops below a configured threshold value.

4. Vendor specific queue depth throttling threshold exceeded. This may be invoked if the number of requests queued to third party vendor logic exceeds a configured threshold value.

5. Reset in progress. This may be invoked while a Circuit Group Reset operation is in progress.

6. Manual intervention via Config Tool. This may be invoked manually at the discretion of the operator.

SMDSS Information Element (IE) Parsing in NIU Configuration File

Member Prints (Span IE) and Resource Groups (Resource Group IE) in the NIU configuration file previously included under the Signaling Manager-Internet Protocol (SMIP) IE (limited to 1 SS pair) will be nested under a new Signaling Manager-Distributed Signaling Silo (SMDSS) IE to identify DSS specific configurations (Multiple SS). Previously CSS included all Resource Groups configured on the system but now only Resource Groups relevant to this collection of signaling servers and media servers will be included.

The only new Child IE in NIU configuration file defines the collection of Signaling Silos and identifies any signaling server pairing. As a child IE under SMDSS, SS List IEs will be repeated to cover all of the SS in this collection. For the case where a silo is actually a pairing (need for SS7), two SS List IEs will be included under SMDSS, one for each SS with the pairing identified by including the other member of the pair in the SS-Alt (Alternate) field. If SS A is paired with SS B, then the first SS List IE will have A as the SS and B as the Partner. Some later SS List IE will have B as the SS and A as the Partner. The media server can use this pairing information to align with the Signaling NIU field in the DSS enhanced commands. In this way, each signaling server instance (5 and 7) can be configured under Signaling Manager with a unique Signaling Module identifier (e.g. 45/47). Signaling Manager will not permit the 2 instances to be configured with the same value. Should a signaling server failover occur, media servers will need to recognize that the Signaling NIU value presented in the Global Reset may be different than the value used for the currently active calls but the reset must still clear these ports.

An NIU configuration parser module is responsible for processing all IEs in the NIU configuration file including the new SMDSS IE and new Child SS List IE. Minimal further validation is required as the SMDSS has no data fields and the SS List only has 2 1-byte fields. The new fields are needed to access the Spans and Resource Groups and are used for port allocation and Circuit Maintenance.

Port Selection

Each media server can receive Select Port and Start Port commands for both Outgoing and Incoming calls from any of the connected signaling servers that it has completed the Reset/Reset Acknowledgement sequence with. It is the responsibility of the media server to select an available port in a single threaded fashion so that each port is assigned to only one call on one signaling server. Since all port selection is restricted to the media server, there is no possibility of a Glare condition—where a port has been selected for both and Incoming and Outgoing call requiring another port search to resolve the conflict. There are a number of alternatives that the media server must support when making a port selection: The NIU id and the Resource field will contain a valid non-zero value and any available port on the media server that is configured within the specified Resource Group can be selected.

The NIU id, Prim id, and the Resource field will contain a valid non-zero value and any available port on the media server that is configured within the specified Resource Group using that Prim can be selected.

The NIU id and Prim id will contain a valid non-zero value and any available port on the media server that is configured using that Prim can be selected.

Since circuit selection is being moved from the signaling server to each individual media server, DSS expects that the Line Events for Circuit Maintenance (Suspend, Resume, Circuit Group Reset, Circuit Use Inquiry) will be sent directly to the media server. Since some of these Operations can force existing calls to be torn down, a Reset from the media server to all connected signaling servers will lead to active calls be terminated from the signaling server side.

SFL Interface

For the DSS version of the signaling server, the media server is exclusively responsible for selecting a port. The Acknowledge from the media server includes the specific data (NIU, Prim, Channel) for the call. The SFL is configured to have a list of media servers (IP Address and port) that it attempts to establish connections with. The initial signaling server choice of media server is either dictated by CSS and the Signaling Module (Outgoing) or made in a random but weighted fashion (Incoming). In some implementations, the media server may have the capability, when permitted, to acknowledge with an alternate media server recommendation. Signaling server may implement cyclic selection of alternate media servers in case the initial selection or recommendation is not available. Signaling server is responsible for keeping track of which media servers have been tried for a particular request to prevent retrying the same media server twice and to limit the number of retry attempts. When the media server returns an acknowledge with a successful status it will include its own media server number plus the selected Prim and Channel from that media server in the response.

Migration

In some implementations, the sequence of events required to Migrate from an existing shared environment to a DSS model where the media servers are shared and there are multiple Silos are as follows:

CSS must be backward compatible (SMIP support remains) and upgraded first.

Media servers must be backward compatible.

Media servers must be upgraded to a DSS compatible level that can learn from the NIU Configuration file whether DSS must be supported.

DSS mode will determine which version is being used and switch the way it functions.

The entire pool of media servers are the first NIU components to get migrated. Since both the Signaling Module and SFL only function in a DSS configuration, they both must be upgraded simultaneously and as a final step. Should a media server not find that it is included in an SMDSS configuration, it will expect that all connected signaling server instances will perform port selection and provide complete NIU, Prim, and Channel information.

Once a signaling server (Signaling Module and SFL/SiaB) has been upgraded, all configured media servers must be running in DSS Mode. A manual process will be required to migrate existing SMIP configurations to SMDSS so that the correct IEs are included in the NIU Configuration file.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Although certain illustrative, non-limiting exemplary embodiments have been presented, various changes, substitutions, permutations, and alterations can be made without departing from the scope of the appended claims. Further, the steps of the methods described herein may be carried out in any suitable order, or simultaneously where appropriate. Thus, the scope of the invention should not necessarily be limited by this description. The scope of the present invention is instead defined by the following claims.

Unless specifically stated otherwise as apparent from the following discussion, it is appreciated that throughout the description, discussions utilizing terms such as "processing," "computing," "transmitting," "receiving," "determining," "displaying," "identifying," "presenting," "establishing," or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices. The system or portions thereof may be installed on an electronic device.

The exemplary embodiments can relate to an apparatus for performing one or more of the functions described herein. This apparatus may be specially constructed for the required purposes and/or be selectively activated or reconfigured by computer executable instructions stored in non-transitory computer memory medium.

It is to be appreciated that the various components of the technology can be located at distant portions of a distributed network and/or the Internet, or within a dedicated secured, unsecured, addressed/encoded and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known Or later developed element(s) that is capable of supplying and/or communicating data to and from the connected elements. The term "module" as used herein can refer to any known or later developed hardware, software, firmware, or combination thereof, that is capable of performing the functions associated with that element.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended ten (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Presently preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method having a programmable processor and memory coupled to a communications network, the method comprising:
   receiving, by a signaling server from a remote endpoint, an invite to the remote endpoint containing the remote endpoint information needed to establish a real-time transport protocol (RTP) session;
   transmitting, by the signaling server to a media server, a command to start a port including a remote internet protocol (IP) address and a remote port number;
   transmitting, by the signaling server to the remote endpoint, an acknowledgment indicating the signaling server viewed the invite;
   receiving, by the signaling server from the media server, an acknowledgement of the start port command and returning the port to be used for a call;

transmitting, by the signaling server to the host server, a command indicating the call to be answered by an application running on the host;

receiving, by the signaling server from the host server, an answer to the call;

receiving, by the signaling server from the media server, a second port selection;

transmitting, by the signaling server to the media server, a second start port command; receiving, by the signaling server from the media server, a second acknowledgment; and establishing, by the signaling server, a second real-time transport protocol (RTP) session stream between the media server and the remote endpoint using the selected second port, wherein the second port is selected from a list of available ports;

wherein the acknowledgement of the start port command is failure and the call is no longer active.

2. The method of claim 1, wherein the acknowledgment is based on acknowledge fields which identify the call by transaction id, network interface unit identification (NIU id), primitive identification (Prim id), channel and call tag.

3. The method of claim 1, wherein acknowledgement of start port command removes the selected port from an available port list.

4. The method of claim 1, wherein the acknowledgement of the start port command is success to continue.

5. The method of claim 1, further comprising:
transmitting, by the signaling server to the remote endpoint, a command indicating that the call has been approved by the host server; and
receiving, by the signaling server from the remote endpoint, an acknowledgment of the call answered by the host server.

6. The method of claim 5, further comprising: transmitting, by the signaling server to the host server, an acknowledgement of the answer to the call.

7. The method of claim 6, further comprising:
Establishing, by the signaling server, a real-time transport protocol (RTP) session stream between the media server and the remote endpoint using the selected port.

8. The method of claim 1, wherein the acknowledgment contains an alternate media server including a media server number, the selected primitive identification (prim id) and channel from the alternate media server.

9. A system comprising a signaling server comprising a processor and memory configured to:
receive, by the signaling server from a remote endpoint, an invite to the remote endpoint containing the remote endpoint information needed to establish a real-time transport protocol (RTP) session;
transmit, by the signaling server to a media server, a command to start a port including a remote internet protocol (IP) address and a remote port number;

transmit, by the signaling server to the remote endpoint, an acknowledgment indicating the signaling server viewed the invite;

receive, by the signaling server from the media server, an acknowledgement of the start port command and returning the port to be used for a call;

transmit, by the signaling server to the host server, a command indicating the call to be answered by an application running on the host; and receive, by the signaling server from the host server, an answer to the call;

receive, by the signaling server from the media server, a second port selection;

transmitting, by the signaling server to the media server, a second start port command;

receive, by the signaling server from the media server, a second acknowledgment; and establishing, by the signaling server, a second real-time transport protocol (RTP) session stream between the media server and the remote endpoint using the selected second port, wherein the second port is selected from a list of available ports; and the acknowledgement of the start port command is success to continue.

10. The system of claim 9, wherein the acknowledgment is based on acknowledge fields which identify the call by transaction id, network interface unit identification (NIU id), primitive identification (Prim id), channel and call tag.

11. The system of claim 9, wherein acknowledgement of start port command removes the selected port from an available port list.

12. The system of claim 9, wherein the acknowledgement of the start port command is success to continue.

13. The system of claim 9, further comprising:
transmitting, by the signaling server to the remote endpoint, a command indicating that the call has been approved by the host server; and
receiving, by the signaling server from the remote endpoint, an acknowledgment of the call answered by the host server.

14. The system of claim 13, further comprising: transmitting, by the signaling server to the host server, an acknowledgement of the answer to the call.

15. The system of claim 14, further comprising: Establishing, by the signaling server, a real-time transport protocol (RTP) session stream between the media server and the remote endpoint using the selected port.

16. The system of claim 9, wherein the acknowledgment contains an alternate media server including a media server number, the selected primitive identification (prim id) and channel from the alternate media server.

\* \* \* \* \*